(12) United States Patent
Fisher

(10) Patent No.: US 7,637,216 B2
(45) Date of Patent: Dec. 29, 2009

(54) ARTICULATING CAMERA TRANSPORT APPARATUS AND METHOD

(75) Inventor: James L. Fisher, Burbank, CA (US)

(73) Assignee: J.L. Fisher, Inc., Burbank, CA (US)

( * ) Notice: Subject to any disclaimer, the term of this patent is extended or adjusted under 35 U.S.C. 154(b) by 324 days.

(21) Appl. No.: 11/888,836

(22) Filed: Jul. 31, 2007

(65) Prior Publication Data

US 2008/0315543 A1 Dec. 25, 2008

Related U.S. Application Data

(63) Continuation-in-part of application No. 11/820,595, filed on Jun. 19, 2007.

(51) Int. Cl.
*B61D 15/00* (2006.01)
(52) U.S. Cl. .................... 105/159; 105/169; 105/215.1; 105/170
(58) Field of Classification Search ......... 104/242–245, 104/247; 105/159, 169, 170, 215.1
See application file for complete search history.

(56) References Cited

U.S. PATENT DOCUMENTS

| | | | |
|---|---|---|---|
| 2,955,546 A | 10/1960 | Liebherr et al. | |
| 4,398,469 A | 8/1983 | Zelli | |
| 4,699,484 A | 10/1987 | Howell et al. | |
| 5,029,795 A | 7/1991 | Dexter | |
| 5,609,108 A | 3/1997 | Chapman | |
| 5,784,966 A | 7/1998 | Brown et al. | |
| 5,974,978 A | 11/1999 | Brown et al. | |
| 6,264,330 B1 | 7/2001 | Walton et al. | |
| 6,520,641 B1 | 2/2003 | Walton et al. | |
| 6,523,957 B1 | 2/2003 | Walton et al. | |
| 6,626,117 B1 | 9/2003 | Chapman | |
| 6,775,475 B1 | 8/2004 | Traver | |
| 7,089,867 B2 | 8/2006 | Nilsen | |
| 2002/0064386 A1 | 5/2002 | Losmandy | |
| 2003/0075070 A1 | 4/2003 | Spielberg et al. | |

FOREIGN PATENT DOCUMENTS

WO WO 96/09490 3/1996

*Primary Examiner*—S. Joseph Morano
*Assistant Examiner*—Zachary Kuhfuss
(74) *Attorney, Agent, or Firm*—Cislo & Thomas, LLP

(57) ABSTRACT

An articulating camera transport apparatus and corresponding methods involving an articulating camera truck for accommodating a camera element and for engaging a set of camera dolly tracks, the tracks having a curvature, the truck including a carrier and an undercarriage, the undercarriage having a plurality of articulating wheels and a structure for gimbaling the plurality of articulating wheels for accommodating the curvature and for facilitating a smooth passage of the truck along the tracks. The gimbaling structure has a gimbaling mechanism which includes a rocker arm.

33 Claims, 14 Drawing Sheets

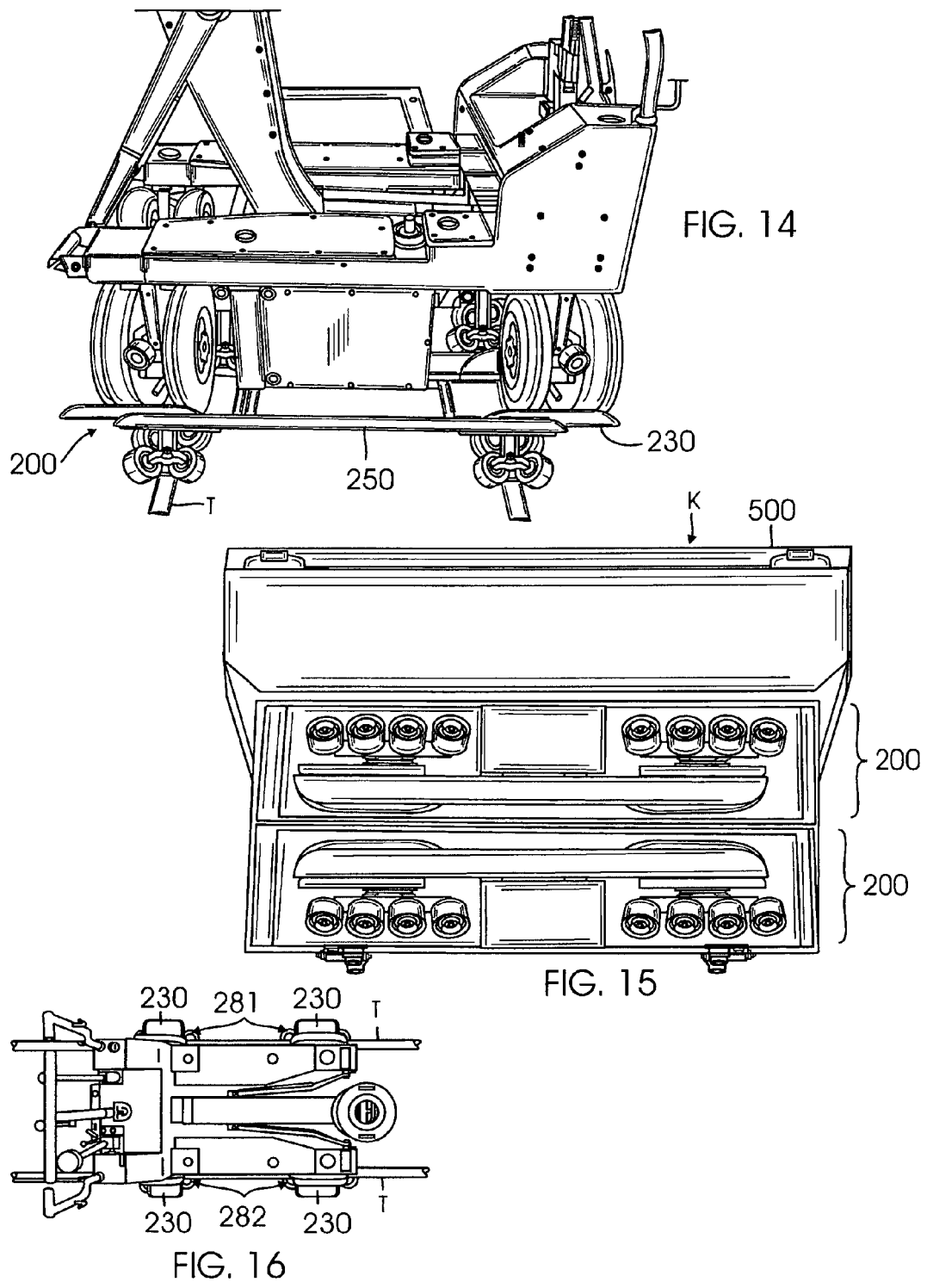

ARTICULATING CAMERA TRANSPORT APPARATUS AND METHOD

CROSS-REFERENCE TO RELATED APPLICATION(S)

This document is a continuation-in-part application of, and claims priority from, a co-pending U.S. patent application Ser. No. 11/820,595, also entitled "Articulating Camera Transport and Apparatus and Method," filed on Jun. 19, 2007, which is hereby incorporated by reference in its entirety.

TECHNICAL FIELD

The present invention technically relates to motion picture apparatuses and methods. More particularly, the present invention technically relates to motion picture apparatuses and methods for accommodating camera equipment. Even more particularly, the present invention technically relates to motion picture apparatuses and methods for accommodating and transporting camera equipment.

BACKGROUND ART

The currently existing related art involves several apparatuses and methods for transporting camera equipment. Spielberg et al. (U.S. Patent Application Publication No. 2003/0075070) discloses a switcher track apparatus comprising four switch units having precisely supported turntables at the intersections of the rails of two tracks, with switch sections of the track on the turntables movable into alternate switching positions in alignment with the two tracks and with magnet assemblies for establishing and releasably holding precise alignment. The wheel assemblies are supported on carriers of a V-shaped cross-sectional shape. Losmandy (U.S. Patent Application Publication No. 2002/0064386) discloses an apparatus and a method for moving and positioning a camera mounted on a dolly, comprising two flexible, but semi-rigid, rails which are positioned parallel to one another such that a dolly with wheels can be placed on, and guided by, the flexible semi-rigid rails.

In addition, Nilsen (U.S. Pat. No. 7,089,867) discloses a device for lifting and repositioning a track used in television and motion picture industries on which a camera dolly or crane is located. The camera dolly includes bogie wheels mounted on a V-shaped bracket. Brown et al. (U.S. Pat. No. 5,974,978) discloses a lightweight, remote-controlled, self-propelled equipment support and transport system, wherein the equipment support is mounted in an angular isolation relative to the drive car by a system of damped pivots about pitch and yaw axes. Chapman (U.S. Pat. No. 5,609,108) discloses a camera dolly which has a track wheel system, including a kingpin pivotally supported on a dolly chassis. Chapman (U.S. Pat. No. 6,626,117) discloses a track wheel system for a camera dolly, wherein a kingpin is pivotably attached to the dolly chassis and an axle is attached to the kingpin. A bushing is placed on a first section of the axle, a wheel bearing is attached to the bushing, and a first track wheel is attached to the wheel bearing.

Zelli (U.S. Pat. No. 4,398,469) discloses a rail-supported carriage, adapted to be moved along a pair of rails spaced from one another at a predetermined distance which includes at least three wheel assemblies, each wheel assembly including a frame. A connecting mechanism connects the oppositely disposed wheel assemblies and includes a compensating arrangement mounted on each wheel assembly for compensating any variation in distance between oppositely disposed wheel assemblies due to any curvature in the rails, each compensating arrangement includes a platform and a pin passing through the platform, and wherein the platform is movable with respect to the frame. Muller et al. (PCT Application Publication No. WO 96/09490) discloses a movable carriage which comprises a support for a camera, the carriage having a frame that is fitted with wheels and rollers. The support is provided with an arm comprising two elements which are mounted telescopically, the lower end of the arm being fixed to the frame to pivot about a vertical axis and oscillate with respect to a horizontal axis, the upper end of the arm carrying the platen to fix the camera which is attached to the upper extremity via a horizontal articulation axis, and the frame comprising, at right angles to the arm, a recess such that the arm can be lowered into the recess to bring the platen substantially to ground level.

Traver (U.S. Pat. No. 6,775,475) discloses a camera supporting chassis having attached clamp wheel assemblies. The clamp wheel assemblies secure opposing supports. A camera is attached to the chassis. A brake secures the chassis. The wheel clamp assemblies also permit roller-movement of the chassis along the supports, thereby allowing panning camera shots with the camera attached to the chassis.

Liebherr et al. (U.S. Pat. No. 2,955,546) discloses an undercarriage for a rotary-tower crane, comprising pivotally mounted wheel bogies connected to supporting members which, in turn, are connected to, and adapted to cooperate with, each corner of the undercarriage. While each of the wheel bogies is pivotally mounted to each of the supporting members, only two of the supporting members are pivotally connected to the carriage, the other two being rigidly connected with such an arrangement. The wheel bogies align themselves with the curved rails of the tracks.

Howell et al. (U.S. Pat. No. 4,699,484) discloses a camera system having a wheeled rail car with front and back running gear being connected to a chassis, the chassis comprising a movable panning head covered by an enclosure. The panning head has a motion picture camera mounted thereon. The rail car is self-propelled. The head rotates up and down and pans 360 degrees. The car is movably installed on a track system, the track system comprising rails connected together via ties. Each rail has a power strip supplying electrical energy to the car through a set of wipers. An electrical control system is positioned remotely from the tracks and provides control for propulsion and positioning of the panning head as well as of the camera. A television monitor receives a signal from the camera, thereby allowing the operator to have visual indication of the scene viewed by the camera. The entire system may be stationary or be mounted on an engine driven vehicle with the operator controlling the system from within the vehicle.

Walton et al. (U.S. Pat. No. 6,523,957) discloses a self-propelled camera dolly having a camera support unit, a drive unit, and a flexible coupling placed between the camera support unit and the drive unit. The camera support unit includes wheels and a camera. The drive unit can move in at least one of a horizontal direction and a vertical direction. The flexible coupling may include three pivots, wherein two of these pivots may be oriented in the vertical and the other in the horizontal direction to aid the movement of the drive unit.

Walton et al. (U.S. Pat. No. 6,520,641) discloses a self-propelled camera dolly having a camera support unit, a drive unit, and a flexible coupling placed between the camera support unit and the drive unit. The drive unit includes at least one drive roller, the guide rollers positioned adjacent to the at least one roller. The guide rollers are biased against the first side and the second side of the center rail. The wheels on the two outer rails are positioned on the two outer rails. The camera support unit is positioned on the two outer rails. The camera support unit is moved along the track to define information of the motion. This information is stored. A scene is shot by operating the camera while moving the camera support unit along the track as a function of the stored information.

Walton et al. (U.S. Pat. No. 6,264,330) discloses a camera positioning system comprising a track having two parallel outer rails and a center rail, a self-propelled camera positioning device, the device comprising a chassis configured to support a camera, wheels coupled to the chassis for riding on the outer rails of the track, and a drive unit for propelling the chassis along the track, the drive unit comprising at least one roller coupled to the chassis for engaging the center rail of the track, and a motor for rotating the at least one roller against the center rail, thereby positioning the chassis along the track, and logic for controlling the drive unit.

Brown et al., U.S. Pat. No. 5,784,966 (Jul. 28, 1998) discloses a light weight, remote-controlled, self-propelled equipment support and transport system that is stabilized against unwanted angular deviation in each of three axes and is adapted for motion at high speed along a simple tubular monorail. The equipment support is mounted in damped pivots about pitch and yaw axes. The drive car includes a steering adjustment adapted to counteract slight variations in wheel alignment that may tend to drive the transport off-level while in motion.

Common problems experienced in the related art are that the wheels do not fully pivot nor articulate, that the wheels do not fully engage the tracks throughout the travel, that a tendency exists for the wheels to separate from the tracks, that undue friction, vibration, and noise are present, whereby filming is undermined, that the scope of use for various dollies or cranes is limited, that the scope of use with different tracks is limited, and the like. FIG. 1 is a bottom view of a plurality of wheels 110 that are mounted to a V-shaped bracket 120 of a camera transport apparatus 100, wherein pivoting is limited and no articulation is provided, in accordance with the prior art. FIG. 3 is a front view of a plurality of wheels 110 that are mounted to a V-shaped bracket 120 of a camera transport apparatus 100, wherein pivoting is limited and no articulation is provided, and wherein the wheels 110 have a tendency to separate from a track T during travel (d>0), in accordance with the prior art. Thus, a long-felt need is seen to exist for an apparatus and a method which provide greater flexibility of use under a wider range of filming conditions.

DISCLOSURE OF THE INVENTION

The present invention addresses the foregoing problems in the related art in an apparatus and corresponding methods for providing wheels that pivot, fully articulate, and fully engage the tracks throughout travel, that eliminate undue friction, vibration, and noise, whereby filming is streamlined, and that have a wide scope of use for various dollies, and tracks. The present invention articulating camera transport apparatus generally comprises an articulating camera truck for accommodating a camera element and for engaging a set of camera dolly tracks, the tracks having a curvature, the truck comprising a carrier and an undercarriage, the undercarriage comprising a plurality of articulating wheels and a structure for gimbaling the plurality of articulating wheels for accommodating the curvature and for facilitating a smooth passage of the truck along the tracks.

The present invention method of fabricating an articulating camera transport apparatus generally comprises the step of providing an articulating camera truck for accommodating a camera element and for engaging a set of camera dolly tracks, the tracks having a curvature, the truck providing step comprising providing a carrier and providing an undercarriage, the undercarriage providing step comprising providing a plurality of articulating wheels and providing a structure for gimbaling the plurality of articulating wheels for accommodating the curvature and for facilitating a smooth passage of the truck along the tracks.

The present invention method of transporting a camera element by way of an articulating camera transport apparatus generally comprises the steps of: providing an articulating camera truck for accommodating a camera element and for engaging a set of camera dolly tracks, the tracks having a curvature, the truck providing step comprising providing a carrier and providing an undercarriage, the undercarriage providing step comprising providing a plurality of articulating wheels and providing a structure for gimbaling the plurality of articulating wheels for accommodating the curvature and for facilitating a smooth passage of the truck along the tracks; disposing the camera element on the articulating camera truck; and applying a force to the articulating camera truck, thereby transporting the camera element.

Advantages of the present invention include, but are not limited to, wheels that pivot, fully articulate, and fully engage the tracks throughout the travel, elimination of undue friction, vibration, and noise, streamlining filming, and a system that has a wide scope of use for various dollies, and tracks, especially tracks that are disposed on extremely uneven topography. Other features of the present invention are disclosed, or are apparent, in the section entitled "Mode(s) for Carrying-Out the Invention," disclosed, infra.

BRIEF DESCRIPTION OF THE DRAWING

For a better understanding of the present invention, reference is made to the below-referenced description of the accompanying Drawing. Reference numbers refer to the same or equivalent parts of the present invention throughout the several figures of the Drawing.

FIG. 14 is a side view of an articulating camera transport apparatus with an extendible carrier, wherein the extension members are deployed to accommodate a camera element, e.g., a "Chinese Model 11" camera dolly with dolly wheels oriented in a position being perpendicular to that of the "Model 11" camera dolly, by example only, having a smaller wheel or tire, and wherein the camera element wheel or tire has three points of contact with the extension member, in accordance with the present invention.

FIG. 15 is a top view of an articulating camera transport kit, comprising a carrying case, a pair of articulating camera transport apparatuses with an extendible carriers, and a placard optionally having indicia, the indicia comprising an element such as a trademark or service mark, in accordance with the present invention.

FIG. 16 is a top view of an articulating camera transport apparatus bearing a camera dolly, by example only, wherein the gimbaling structure comprises color-coding for facilitating orientation of a pair of articulating camera transport apparatuses with extendible carriers, wherein a blue marking may indicate the set of articulating wheels which do not translate, and wherein a red marking may indicate the set of articulating wheels which do translate for accommodating varying distance between the tracks, by example only, such that the apparatuses are consistently disposed on the tracks, in accordance with the present invention.

MODE(S) FOR CARRYING OUT THE INVENTION

Figure 1:
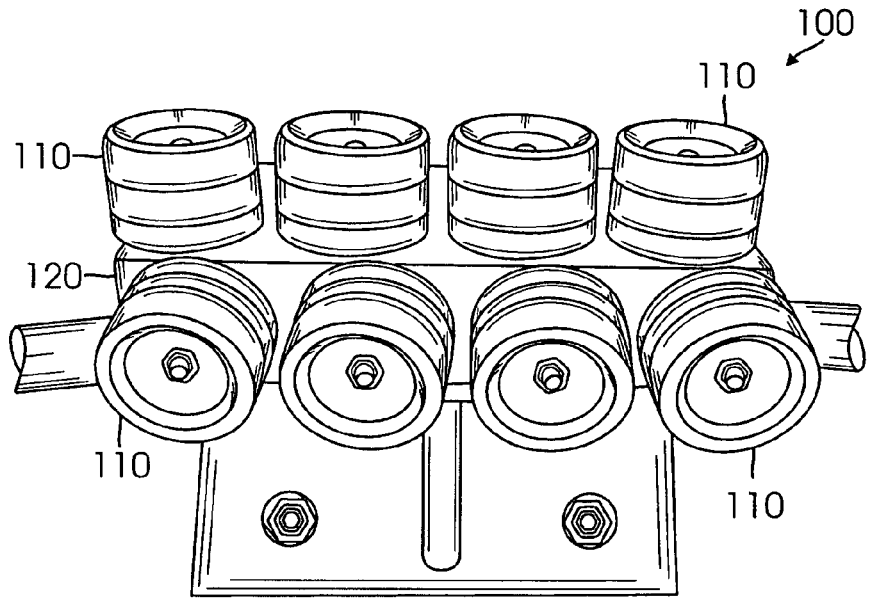
FIG. 1 is a bottom view of a plurality of wheels that are mounted to a V-shaped bracket of a camera transport apparatus, wherein pivoting is limited, and wherein no articulation is provided, in accordance with the prior art.
Figure 2:
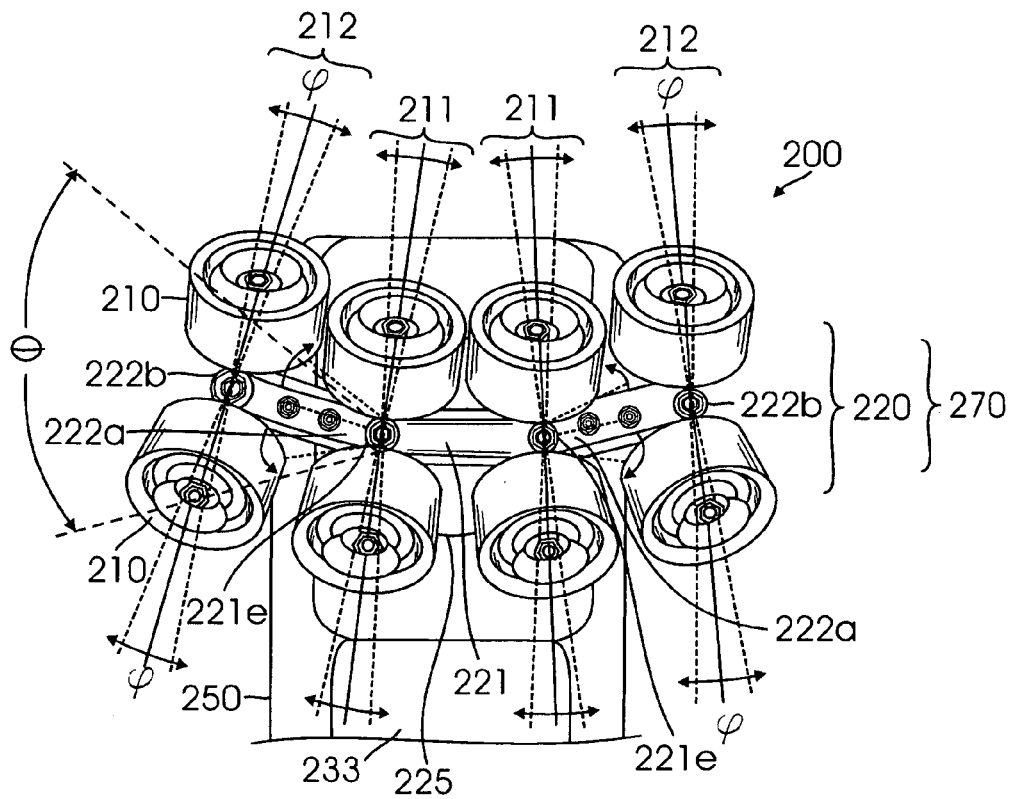
FIG. 2 is a bottom view of a structure for gimbaling a plurality of wheels of an articulating camera transport apparatus, wherein the wheels pivot as well as articulate, in accordance with the present invention.
Figure 3:
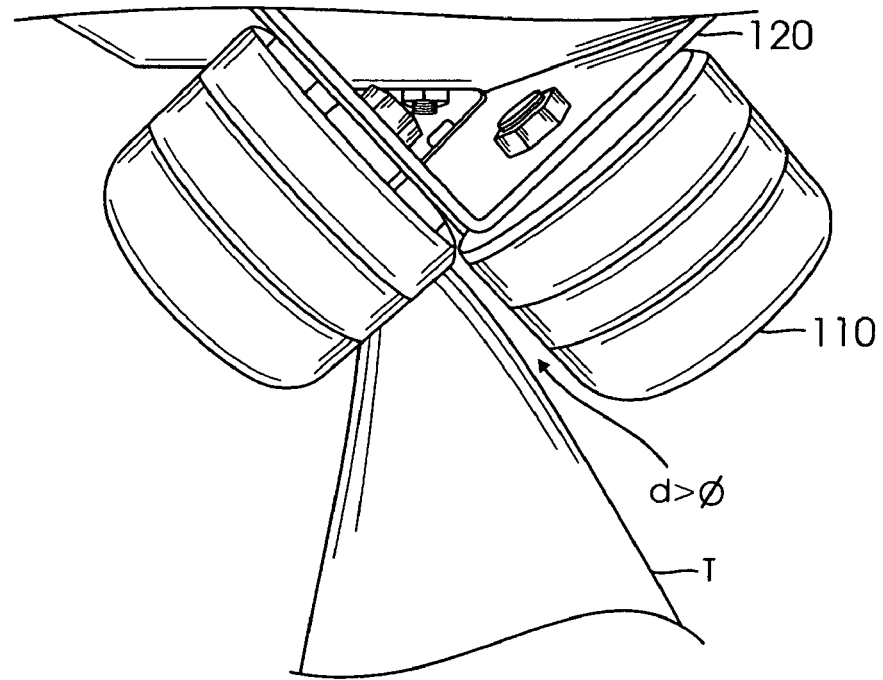
FIG. 3 is a front view of a plurality of wheels that are mounted to a V-shaped bracket of a camera transport apparatus, wherein pivoting is limited and no articulation is provided, and wherein the wheels have a tendency to separate from a track during travel, in accordance with the prior art.

FIG. 2 illustrates, in a bottom view, a structure 220 for gimbaling a plurality of wheels 210 of an articulating camera transport apparatus 200, wherein the wheels 210 pivot at an angle theta as well as articulate at an angle phi, in accordance with the present invention. The articulating camera transport apparatus 200 generally comprises an articulating camera truck 240 for accommodating a camera element 300 and for engaging a set of camera dolly tracks T, the tracks T having a curvature, the truck 240 comprising a carrier 250 and an undercarriage 260, the undercarriage 260 comprising a plurality of articulating wheels 210 and a mechanism 270 for gimbaling the plurality of articulating wheels 210 for accommodating the curvature and for facilitating a smooth passage of the truck 240 along the tracks T. The camera element 300 comprises at least one element such as a camera platform (not shown), a camera dolly (FIGS. 12A, 13A, and 14), a camera crane (not shown), and a camera crane base (not shown).

Still referring to FIG. 2, each set of articulating wheel pairs may comprise four articulating wheel pairs. The four articulating wheel pairs may comprise two pairs of inboard articulating wheel pairs 211 and two pairs of outboard articulating wheel pairs 212, wherein the inboard articulating wheel pairs 211 are pivotally mounted to the respective rigid section ends 221e and to the moment arm section proximal ends 222a, whereby the inboard articulating wheel pairs 211 pivot in relation to the rigid section 221, and wherein the outboard articulating wheel pairs 212 are pivotally mounted to the respective moment arm distal ends 222b, whereby the outboard articulating wheel pairs 212 swing in relation to the rigid section 221 in an angle theta, and whereby mechanical stability and articulation at an angle phi are optimized. Each wheel pair independently gimbals from any other wheel pair. The plurality of articulating wheels 210 may comprise a plurality of skateboard wheels. The plurality of skateboard wheels comprise a respective plurality of skateboard "tires" which are made from at least one material, such as a flexible polymer, an elastic polymer, an elastomer, a polyurethane, a rubber, a nylon, a fluorinated polymer, and a resin engineering plastic, e.g., Delrin®, polyoxymethylene (POM), acetal resin, polytrioxane and polyformaldehyde, for facilitating smoothness and shock absorption.

Figure 4:
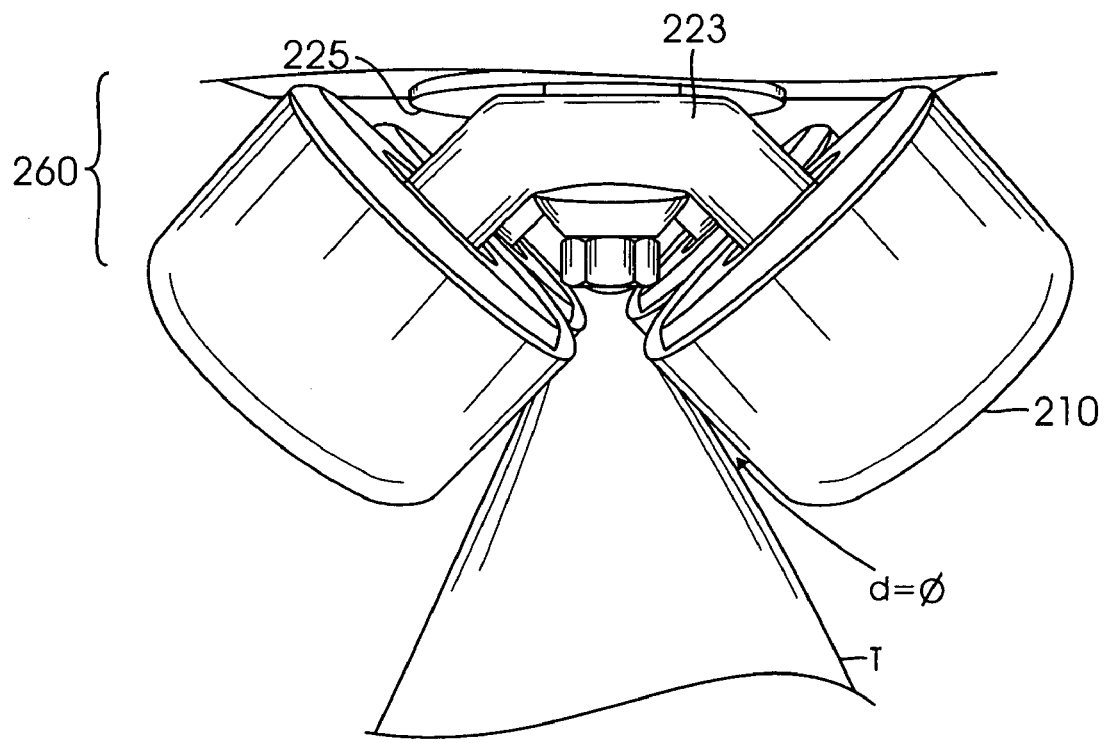
FIG. 4 is a front view of a plurality of wheels that are mounted to a mounting bracket of an articulating camera transport apparatus, wherein pivoting and articulation are provided, and wherein the wheels remain in contact with a track during travel, in accordance with the present invention.

Referring to FIGS. 2 and 4, the angled axle 223 preferably subtends an angle of approximately 90°. The undercarriage 260 comprises at least one slot (not shown) for facilitating translation of the mounting bracket in order to accommodate varying distances between the tracks T. The wheel mounting bracket comprises a swivel member 225 being pivotally coupled to the undercarriage 260, wherein the swivel member 225 is pivotally coupled to the undercarriage 260 through the at least one slot, wherein the gimbaling mechanism 270 further comprises at least one low friction-coefficient member 226 such as a gasket and a washer, the at least one friction-coefficient member 226 being disposed between the swivel member 225 and the undercarriage 260, and wherein the low friction-coefficient member 226 comprises at least one material such as a polymer, a composite, a polypropylene, a polyethylene, and a fluorinated polymer. The swivel member 225 may be mechanically coupled or integrally formed with the rigid section 221.

FIG. 4 illustrates, in a front view, a plurality of wheels 210 that are mounted to a mounting bracket of an articulating camera transport apparatus 200, wherein pivoting and articulation are provided, and wherein the plurality of wheels 210 remain in contact with a track T during travel (d=0), in accordance with the present invention. The plurality of articulating wheels 210 comprises at least one wheel configuration such at least one pair of articulating wheels, at least four pairs of articulating wheels, at least two sets of articulating wheel pairs, and at least four sets of articulating wheel pairs. The gimbaling mechanism 270 comprises a wheel mounting bracket coupled to the undercarriage 260, the wheel mounting bracket 220 including a rigid section 221 having two ends 221e and at least one moment arm section 222 having proximal and distal ends 222a, 222b, the at least one moment arm section proximal end 222a being pivotally coupled with one end of the rigid section ends 221e, and an angled axle 223 corresponding to each wheel pair, the angled axle 223 being rotatably coupled to the at least one moment arm section 222.

Figure 5:
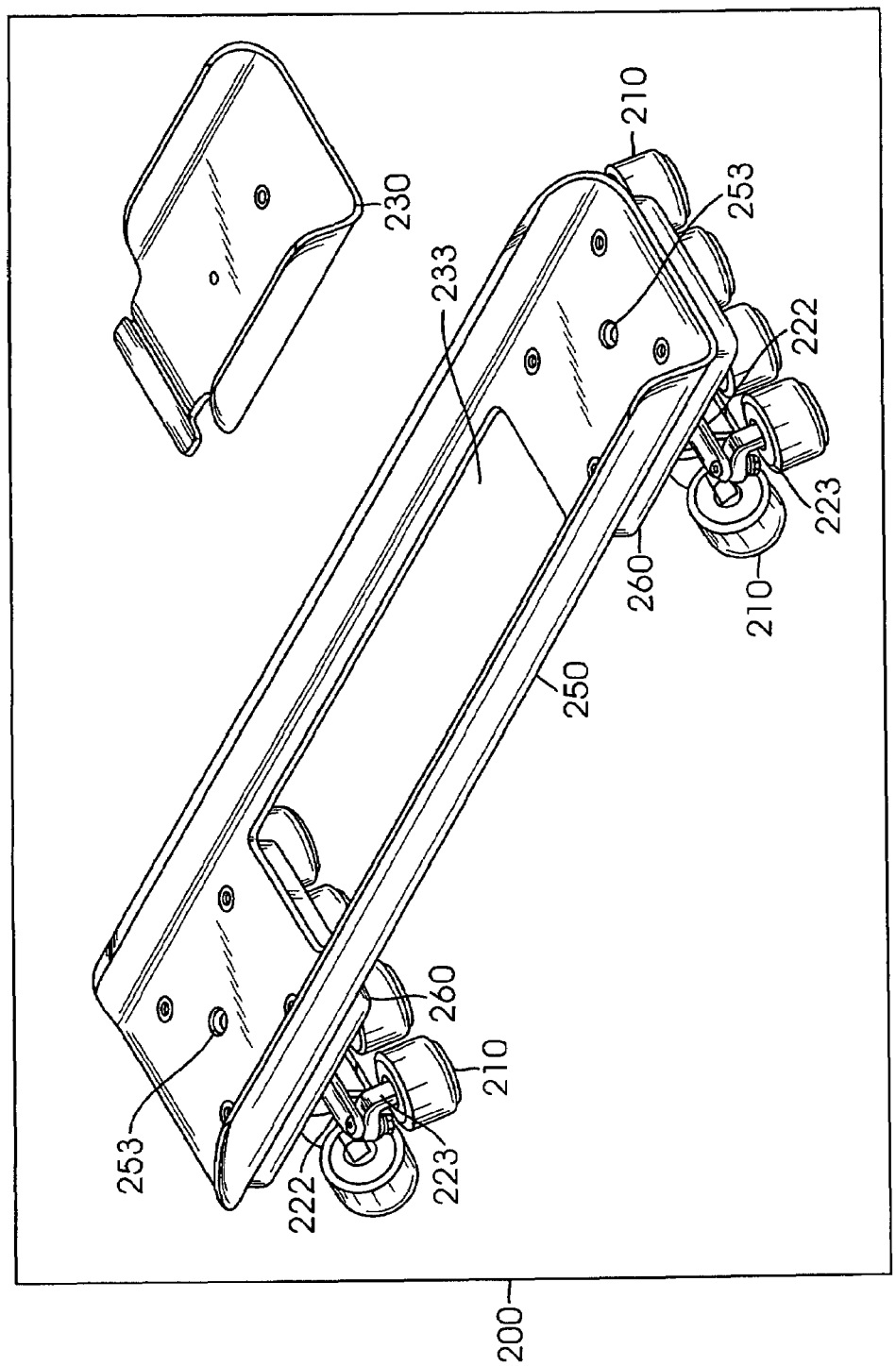
FIG. 5 is a perspective view of an articulating camera transport apparatus with an extendible carrier, wherein the extendible carrier comprises an extension member, in accordance with the present invention.

FIG. 5 illustrates, in a perspective view, an articulating camera transport apparatus 200 with an extendible carrier, wherein the extendible carrier 250 comprises an extension member 230, in accordance with the present invention. The articulating camera transport apparatus 200 generally comprises an articulating camera truck 240 for accommodating a camera element 300 and for engaging a set of camera dolly tracks T, the tracks T having a curvature, the truck 240 comprising a carrier 250 and an undercarriage 260, the undercarriage 260 comprising a plurality of articulating wheels 210 and a mechanism 270 for gimbaling the plurality of articulating wheels 210 for accommodating the curvature of the tracks T and for facilitating a smooth passage of the truck 240 along the tracks T. The carrier 250 comprises at least one outboard edge 251 and an inboard open section 252, the carrier 250 being extendible for accommodating varying sizes and orientations of the camera element 300.

Figure 6:
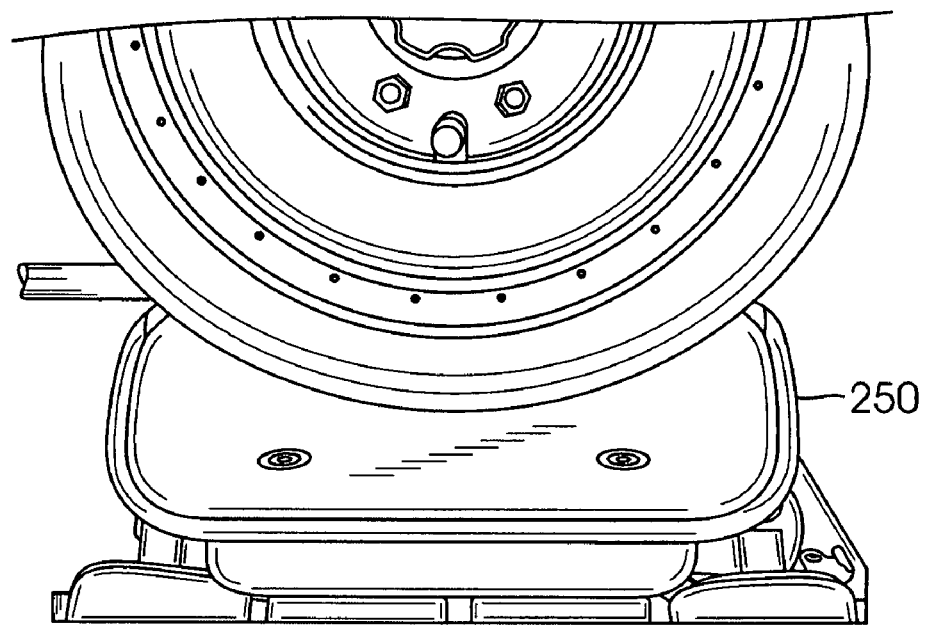
FIG. 6 is a side view of an articulating camera transport apparatus with an extendible carrier, wherein an extension member is removed to accommodate a camera element, e.g., a camera dolly, having a larger wheel or tire, and wherein the camera element wheel or tire has three points of contact with the carrier, in accordance with the present invention.

FIG. 6 illustrates, in a side view, an articulating camera transport apparatus 200 with an extendible carrier 250, wherein an extension member 230 is removed to accommodate a camera element 300, e.g., a camera dolly, having a larger wheel or tire, and wherein the camera element wheel or tire has three points of contact with the carrier 250 or the extension member 230, in accordance with the present invention.

Figure 7:
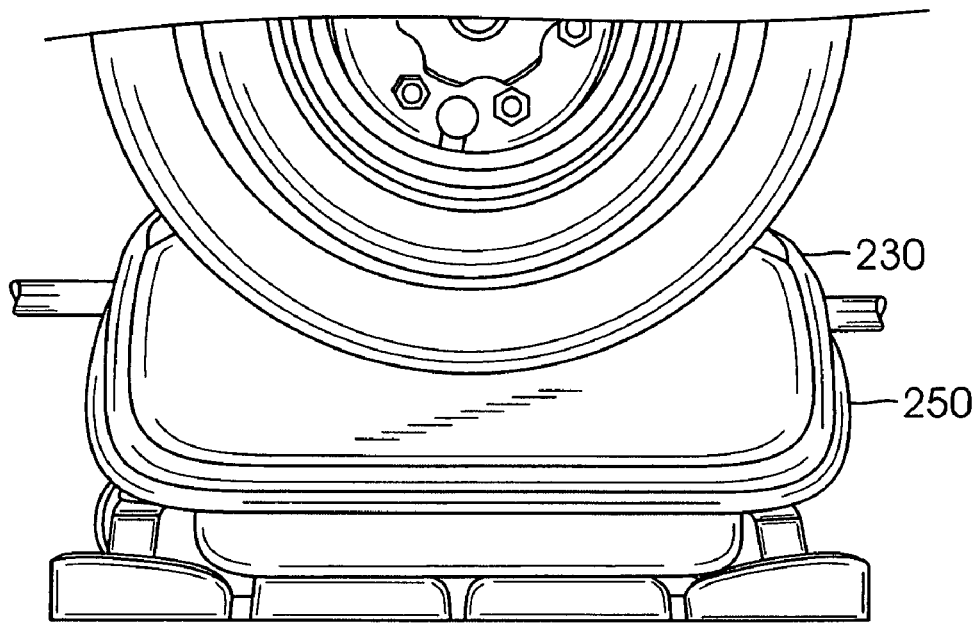
FIG. 7 is a side view of an articulating camera transport apparatus with an extendible carrier, wherein an extension member is undeployed to accommodate a camera element, e.g., a camera dolly, having a smaller wheel or tire, and wherein the camera element wheel or tire has three points of contact with the extension member, in accordance with the present invention.

FIG. 7 illustrates, in a side view, an articulating camera transport apparatus 200 with an extendible carrier 250, wherein an extension member 230 is undeployed to accommodate a camera element 300, e.g., a camera dolly, having a smaller wheel or tire, and wherein the camera element wheel or tire has three points of contact with the extension member 230 which provides further stability, in accordance with the present invention.

Figure 8:
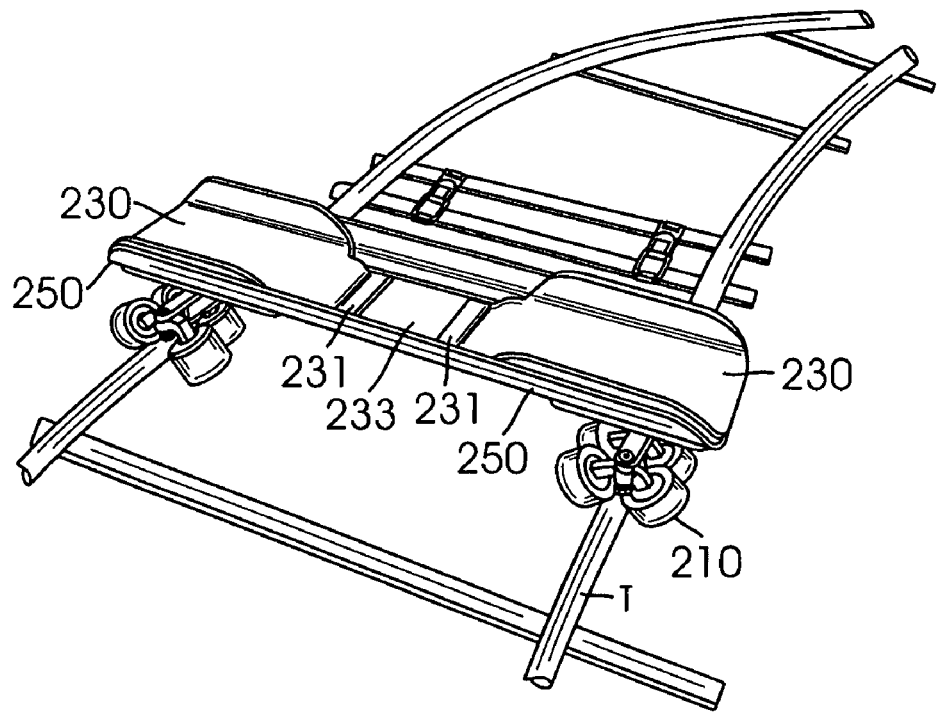
FIG. 8 is a perspective view of an articulating camera transport apparatus with an extendible carrier which is traveling along a set of curved tracks, wherein the extension members are undeployed, in accordance with the present invention.

FIG. 8 illustrates, in a perspective view, an articulating camera transport apparatus 200 with an extendible carrier 250 that is traveling along a set of curved tracks T, wherein the extension members 230 are undeployed, in accordance with the present invention.

Figure 9:
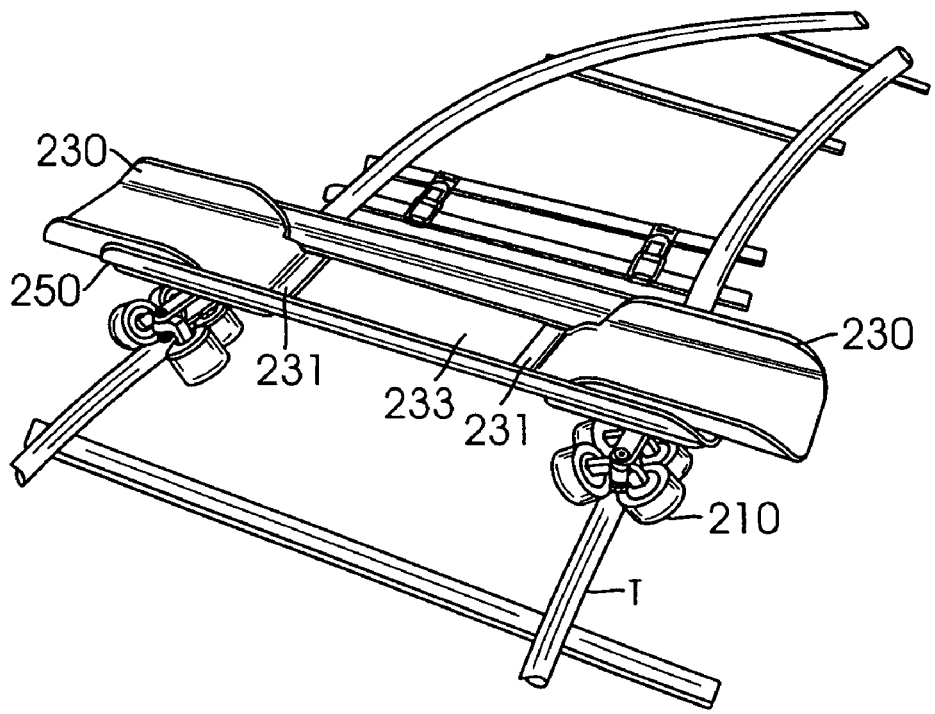
FIG. 9 is a perspective view of an articulating camera transport apparatus with an extendible carrier which is traveling along a set of curved tracks, wherein the extension members are deployed, in accordance with the present invention.

FIG. 9 illustrates, in a perspective view, an articulating camera transport apparatus 200 with an extendible carrier 250 that is traveling along a set of curved tracks T, wherein the extension members 230 are deployed, in accordance with the present invention.

Figure 10:
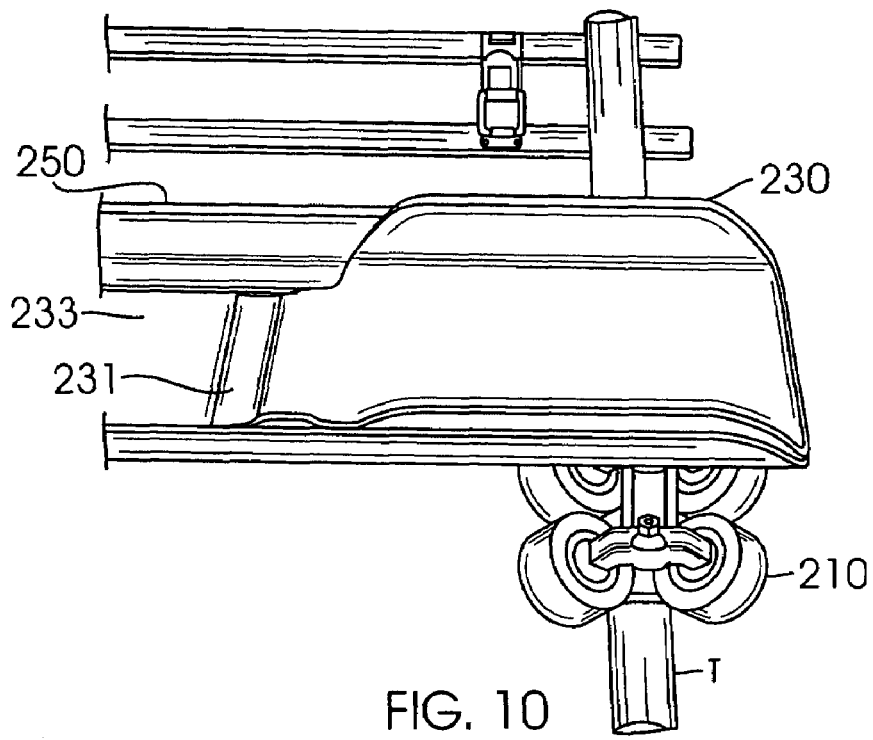
FIG. 10 is a partial perspective view of an articulating camera transport apparatus with an extendible carrier which is traveling along a set of curved tracks, wherein the carrier further comprises an extension member, wherein the extension member is undeployed, the extension member comprising a retaining flange and at least one pin member disposed on a lower surface of the extension member for selective registration with at least one registration element such as the tap and the outboard edge, the retaining flange being translatable within the inboard open section for imparting structural stability to the extension member, in accordance with the present invention.

FIG. 10 illustrates, in a partial perspective view, an articulating camera transport apparatus 200 with an extendible carrier 250 that is traveling along a set of curved tracks T, wherein the carrier 250 further comprises at least one tap 253 and at least one extension member 230, the at least one extension member 230 comprising a retaining flange 231 and at least one pin member (not shown) disposed on a lower surface of the at least one extension member 230 for selective registration with at least one registration element such as the at least one tap 253 and the at least one outboard edge 251, the retaining flange 231 being translatable within the inboard open section 233 for imparting structural stability to the at least one extension 230, in accordance with the present invention. The extension 230 is shown in an undeployed inboard position.

Figure 11:
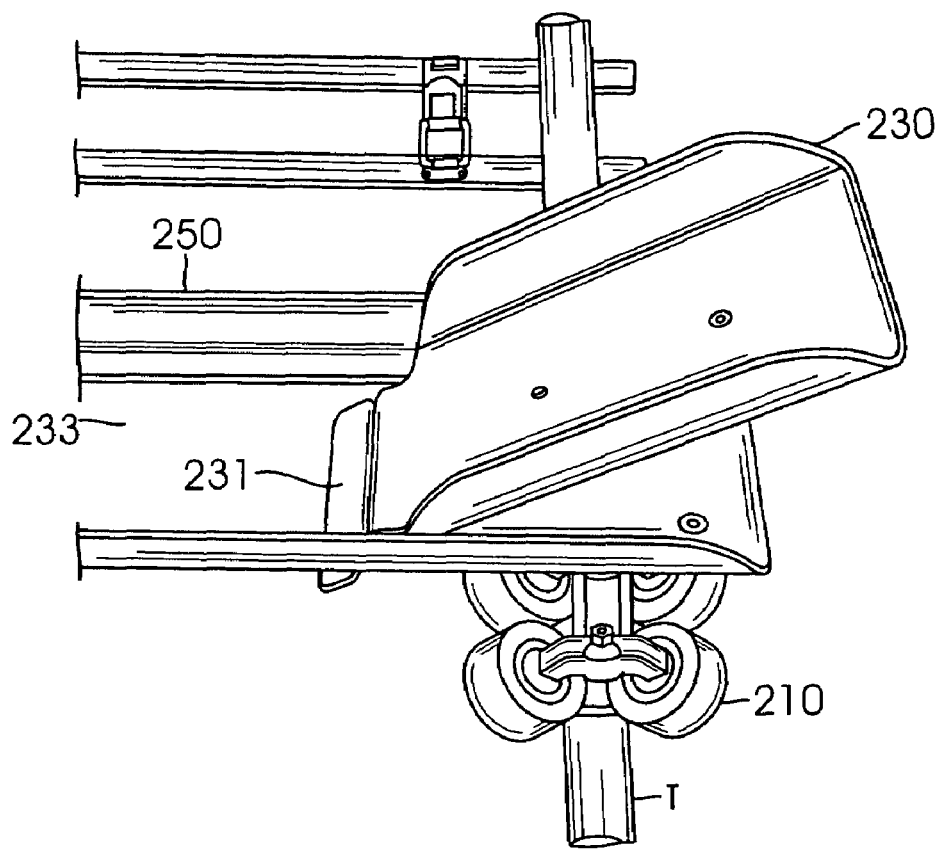
FIG. 11 is a partial perspective view of an articulating camera transport apparatus with an extendible carrier which is traveling along a set of curved tracks, wherein the carrier further comprises an extension member, wherein the extension member is being deployed, the extension member comprising a retaining flange and at least one pin member disposed on a lower surface of the extension member for selective registration with at least one registration element such as the tap and the outboard edge, the retaining flange being translatable within the inboard open section for imparting structural stability to the extension member, in accordance with the present invention.

FIG. 11 illustrates, in a partial perspective view, an articulating camera transport apparatus 200 with an extendible carrier 250 which is traveling along a set of curved tracks T, wherein the carrier 250 further comprises at least one tap 253 and at least one extension member 230, the at least one extension member 230 comprising a retaining flange 231 and at least one pin member (not shown) disposed on a lower surface of the at least one extension member 230 for selective registration with at least one registration element selected from a group consisting essentially of the at least one tap 253 and the at least one outboard edge 251, the retaining flange 231 being translatable within the inboard open section 233 for imparting structural stability to the at least one extension 230, in accordance with the present invention. The extension 230 is shown being deployed by manually translation into an outboard position.

Figure 12A:
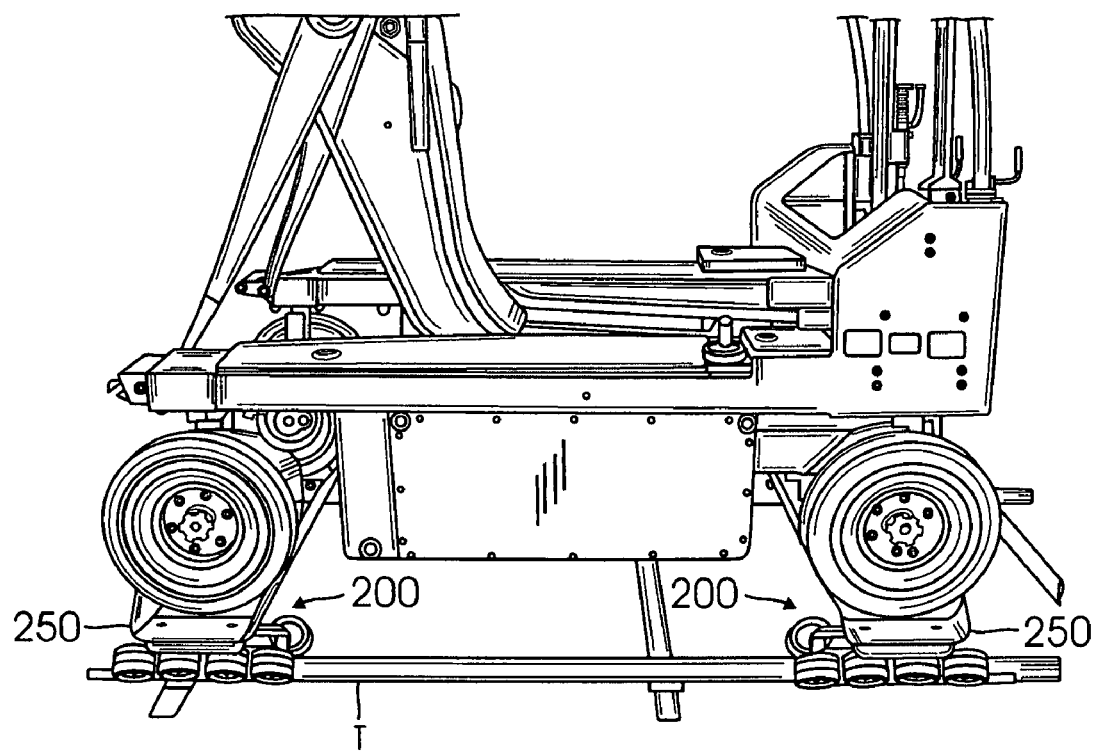
FIG. 12A is a side view of an articulating camera transport apparatus with an extendible carrier, wherein the extension members are removed to accommodate a camera element, e.g., a "Model 10" camera dolly by example only, having a larger wheel or tire, and wherein the camera element wheel or tire has three points of contact with the carrier, in accordance with the present invention.

FIG. 12A illustrates, in a side view, an articulating camera transport apparatus 200 with an extendible carrier 250, wherein the extension members 230 are removed to accommodate a camera element 300, e.g., a "Model 10" camera dolly by example only, having a larger wheel or tire, and wherein the larger camera element wheel or tire has three points of contact with the carrier 250, in accordance with the present invention.

Figure 12B:
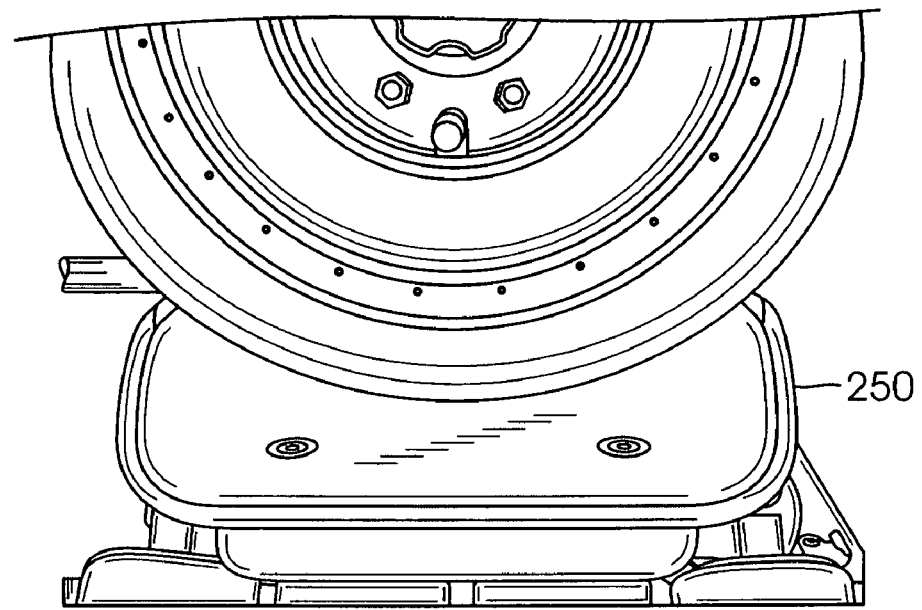
FIG. 12B is a close side view of an articulating camera transport apparatus with an extendible carrier, as shown in FIG. 12A, wherein the extension members are removed to accommodate a camera element, e.g., a "Model 10" camera dolly by example only, having a larger wheel or tire, and wherein the camera element wheel or tire has three points of contact with the carrier, in accordance with the present invention.

FIG. 12B illustrates, in a close side view, an articulating camera transport apparatus 200 with an extendible carrier 250, as shown in FIG. 12A, wherein the extension members 230 are removed to accommodate a camera element 300, e.g., a "Model 10" camera dolly by example only, having a larger wheel or tire, and wherein the larger camera element wheel or tire has three points of contact with the carrier 250, in accordance with the present invention.

Figure 13A:
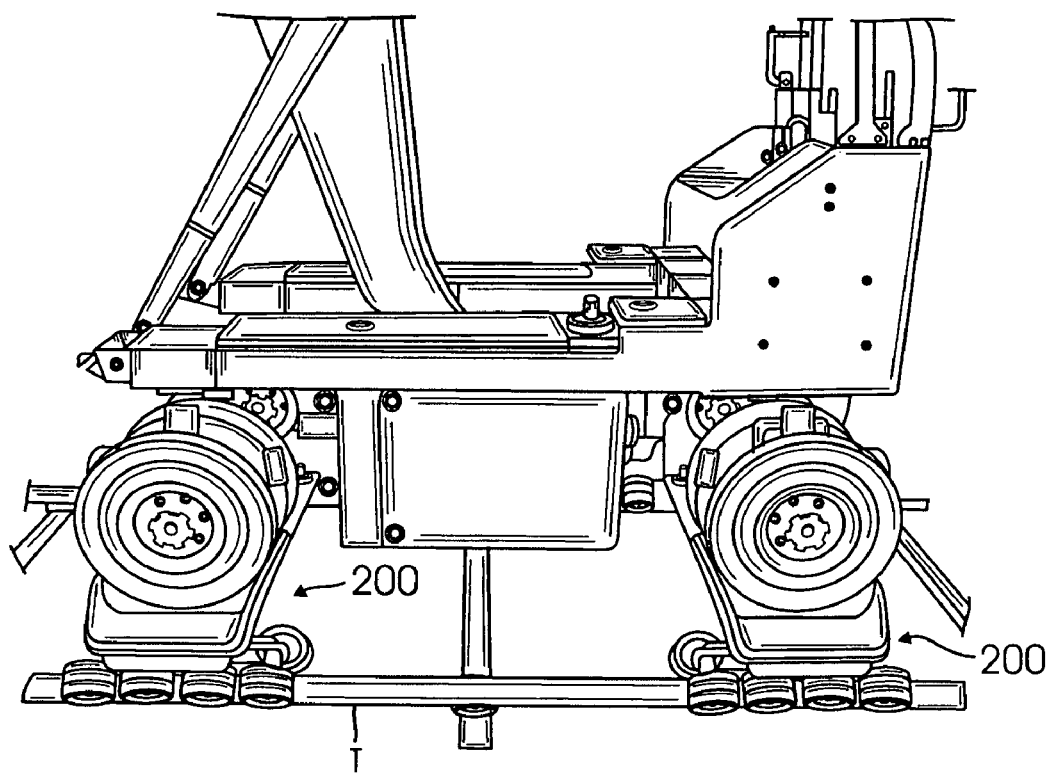
FIG. 13A is a side view of an articulating camera transport apparatus with an extendible carrier, wherein the extension members are undeployed to accommodate a camera element, e.g., a "Model 11" camera dolly by example only, having a smaller wheel or tire, and wherein the camera element wheel or tire has three points of contact with the extension member, in accordance with the present invention.

FIG. 13A illustrates, in a side view, an articulating camera transport apparatus 200 with an extendible carrier 250, wherein the extension members 230 are undeployed to accommodate a camera element 300, e.g., a "Model 11" camera dolly by example only, having a smaller wheel or tire, and wherein the smaller camera element wheel or tire has three points of contact with the extension member 230, in accordance with the present invention.

Figure 13B:
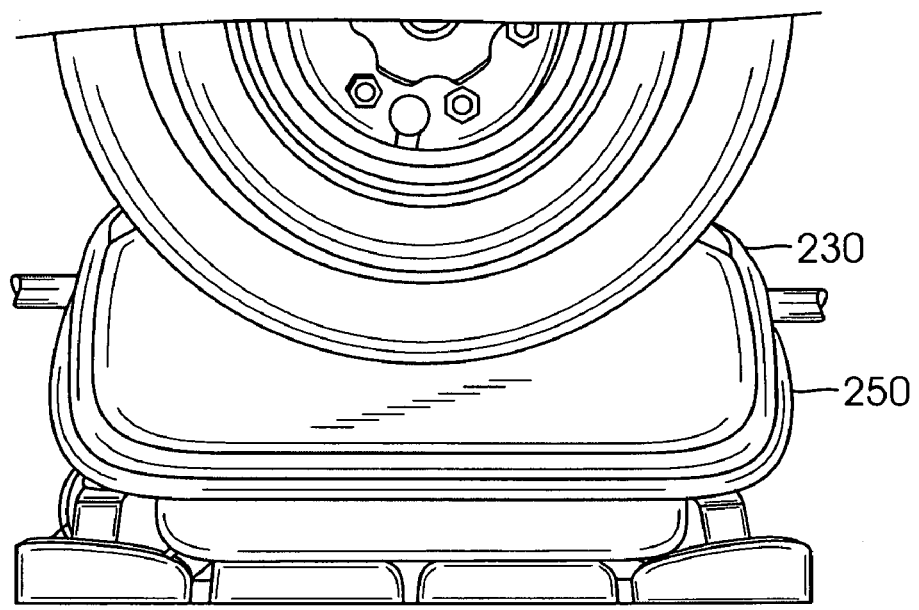
FIG. 13B is a close side view of an articulating camera transport apparatus with an extendible carrier, wherein the extension members are undeployed to accommodate a camera element, e.g., a "Model 11" camera dolly by example only, having a smaller wheel or tire, and wherein the camera element wheel or tire has three points of contact with the extension member, in accordance with the present invention.

FIG. 13B illustrates, in a close side view, an articulating camera transport apparatus 200 with an extendible carrier 250, wherein the extension members 230 are undeployed to accommodate a camera element 300, e.g., a "Model 11" camera dolly by example only, having a smaller wheel or tire, and wherein the smaller camera element wheel or tire has three points of contact with the extension member 230, in accordance with the present invention.

FIG. 14 illustrates, in a side view, an articulating camera transport apparatus 200 with an extendible carrier 250, wherein the extension members 230 are deployed to accommodate a camera element 300, e.g., a "Chinese Model 11" camera dolly with dolly wheels oriented in a position being perpendicular to that of the "Model 11" camera dolly, by example only, having a smaller wheel or tire, and wherein the perpendicularly-oriented smaller camera element wheel or tire has three points of contact with the extension member 230, in accordance with the present invention.

FIG. 15 illustrates, in a top view, an articulating camera transport kit K, the kit K comprising a carrying case 500, at least one articulating camera transport apparatus 200 with an extendible carrier 250, in accordance with the present invention. The kit K further comprises at least one placard (not shown), wherein the at least one placard comprises indicia, the indicia comprising an element such as a trademark or service mark.

FIG. 16 illustrates, in a top view, an articulating camera transport apparatus 200 bearing a camera dolly, by example only, wherein the gimbaling mechanism 270 comprises color-coding 280 for facilitating orientation of the articulating camera transport apparatus 200 with an extendible carrier 250, wherein a blue marking 281 may indicate the set of articulating wheels 210 which do not translate, and wherein a red marking 282 may indicate the set of articulating wheels 210 which do translate for accommodating varying distance between the tracks T, by example only, such that the apparatus 200 is consistently disposed on the tracks T for ensuring smoothness of travel, in accordance with the present invention.

Figure 17:
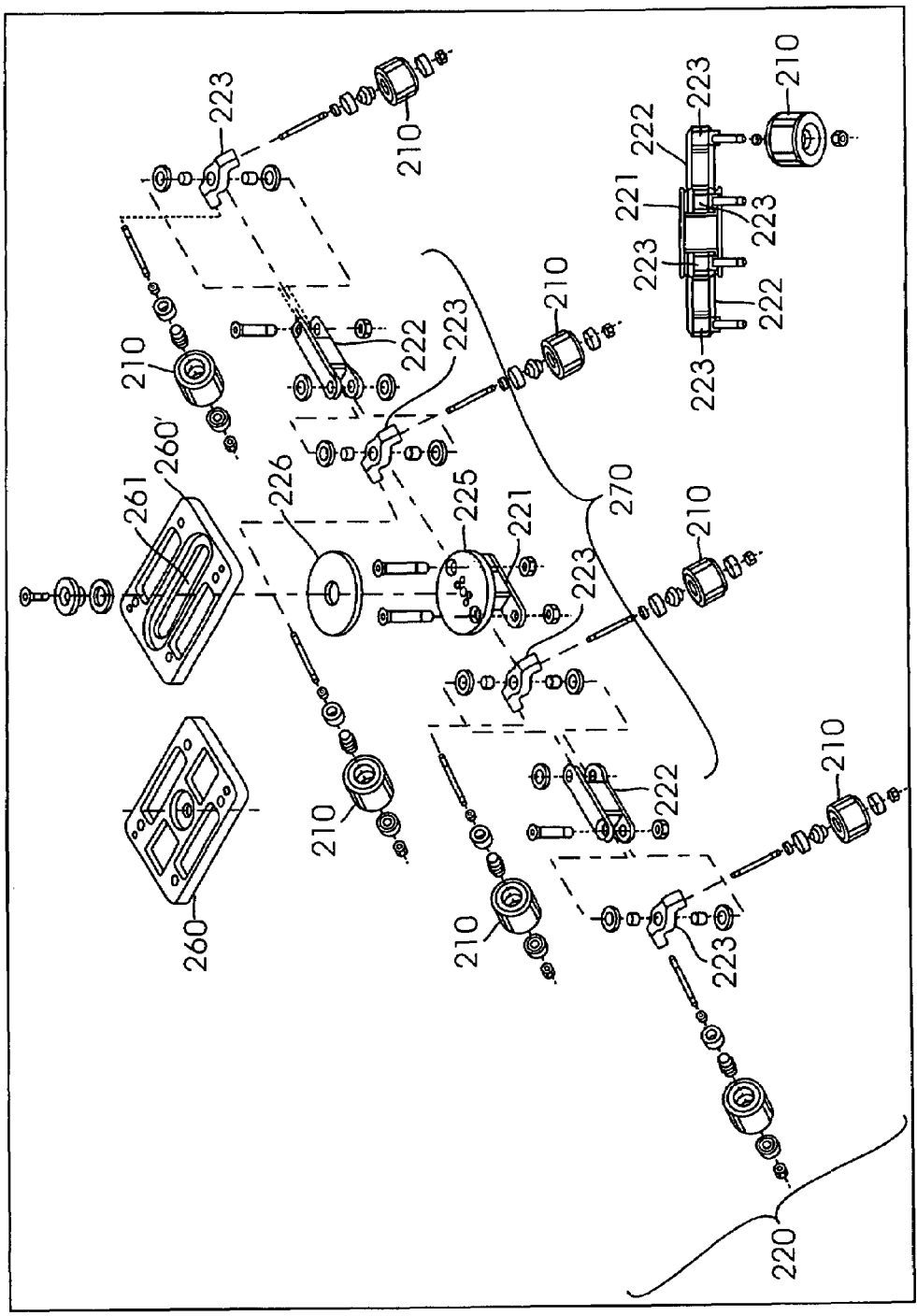
FIG. 17 is an exploded perspective view of a gimbaling structure of an articulating camera transport apparatus, in accordance with the present invention.

FIG. 17 illustrates, in an exploded perspective view, a gimbaling mechanism 270 of an articulating camera transport apparatus 200, in accordance with the present invention. The gimbaling mechanism 270 comprises a wheel mounting bracket coupled to the undercarriage 260, the wheel mounting bracket including a rigid section 221 having two ends 221e and at least one moment arm section 222 having proximal and distal ends 222a, 222b, the at least one moment arm section proximal end 222a being pivotally coupled with one end of the rigid section ends 221e, and an angled axle 223 corresponding to each wheel pair, the angled axle 223 being rotatably coupled to the at least one moment arm section 222. The wheel mounting bracket comprises a swivel member 225 being pivotally coupled to the undercarriage 260 or 260', wherein the swivel member 225 is pivotally coupled to the undercarriage 260' through the at least one slot 261, wherein the gimbaling structure 270 further comprises at least one low friction-coefficient member 226, such as a gasket and a washer, the at least one friction-coefficient member 226 being disposed between the swivel member 225 and the undercarriage 260, and wherein the low friction-coefficient member 226 comprises at least one material, such as a flexible polymer, an elastic polymer, an elastomer, a polyurethane, a rubber, a nylon, a fluorinated polymer, and a resin engineering plastic, e.g., Delrin®, polyoxymethylene (POM), acetal resin, polytrioxane and polyformaldehyde, for facilitating smoothness and shock absorption. The swivel member 225 may be mechanically coupled or integrally formed with the rigid section 221.

Figure 18:
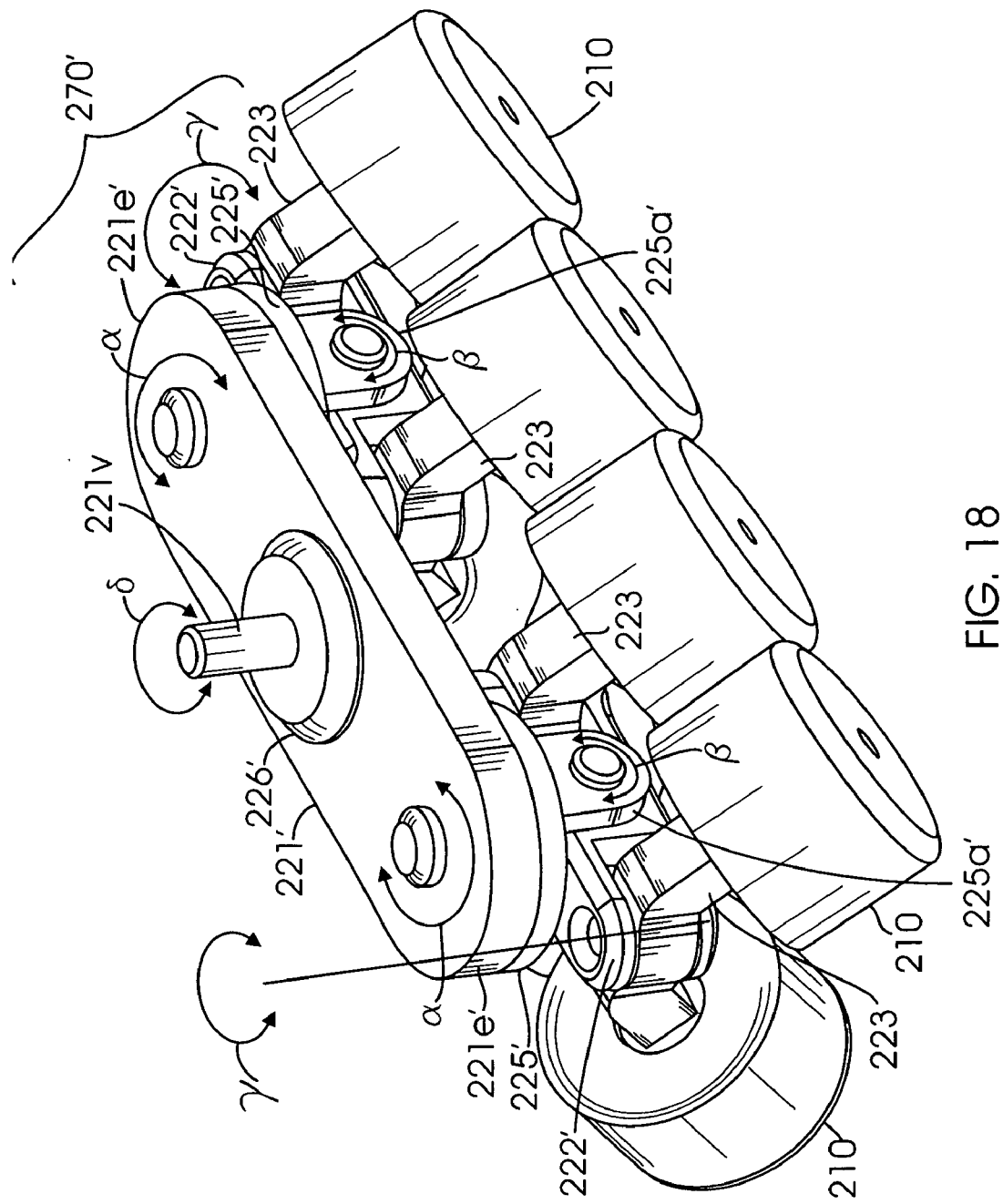
FIG. 18 is a perspective view of a gimbaling mechanism of an articulating camera transport apparatus, in accordance with an alternative embodiment of the present invention.

FIG. 18 illustrates, in a perspective view, a gimbaling mechanism 270' of an articulating camera transport apparatus 200, in accordance with an alternative embodiment of the present invention. The gimbaling mechanism 270' comprises a wheel mounting bracket coupled to the undercarriage 260 (not shown), the wheel mounting bracket including a rigid section 221' having two ends 221e' and at least one rocker arm 222' having two ends and a mid-section 222c'. The rocker arm 222' facilitates smooth travel over hilly or bumpy sections of the tracks T. The at least one rocker arm mid-section 222c' is pivotally coupled with one end of the rigid section ends 221e', wherein the at least one rocker arm 222' is rotatable in relation to the rigid section 221' at an angle alpha in a horizontal plane as well as at an angle beta in a vertical plane. An angled axle 223 is rotatably coupled to the at least one rocker arm end, wherein the at least one angled axle 223 is further rotatable in relation to the at least one rocker arm 222' at an angle gamma in a horizontal plane. The rigid section 221' further comprises vertical member 221v, such as a pin, a rod, and a dowel, which is mechanically coupled to, or integrally formed with, the rigid section 221', wherein the rigid section is rotatable in relation to the undercarriage 260, 260' at an angle delta in a horizontal plane. The combined rotation at the angles alpha, beta, gamma, and delta facilitates smooth travel of the apparatus 200 on curved, bumpy, and uneven tracks T.

Still referring to FIG. 18, the wheel mounting bracket may also comprise at least one swivel member 225 (not shown) that is pivotally coupled to the undercarriage 260 or 260' (not shown), wherein the swivel member 225 is pivotally coupled to the undercarriage 260 or 260' through the at least one slot 261 (not shown), wherein the gimbaling mechanism 270' further comprises at least one low friction-coefficient member 226', such as a gasket and a washer, the at least one friction-coefficient member 226' being disposed between the swivel member 225 and the undercarriage 260 or 260', and wherein the low friction-coefficient member 226' comprises at least one material such as a flexible polymer, an elastic polymer, an elastomer, a polyurethane, a rubber, a nylon, a fluorinated polymer, and a resin engineering plastic, e.g., Delrin®, polyoxymethylene (POM), acetal resin, polytrioxane and polyformaldehyde, for facilitating smoothness and shock absorption. The swivel member 225 may be mechanically coupled or integrally formed with the rigid section 221'. The gimbaling mechanism 270' further comprises at least one additional swivel member 225' that is coupled with the at least one rocker arm 222'. The swivel member 225' comprises a mounting portion 225a' for facilitating coupling and rotation of the rocker arm 222'. The gimbaling mechanism 270' further comprises additional low friction-coefficient members (now shown) corresponding to each swivel member 225'.

Figure 19:
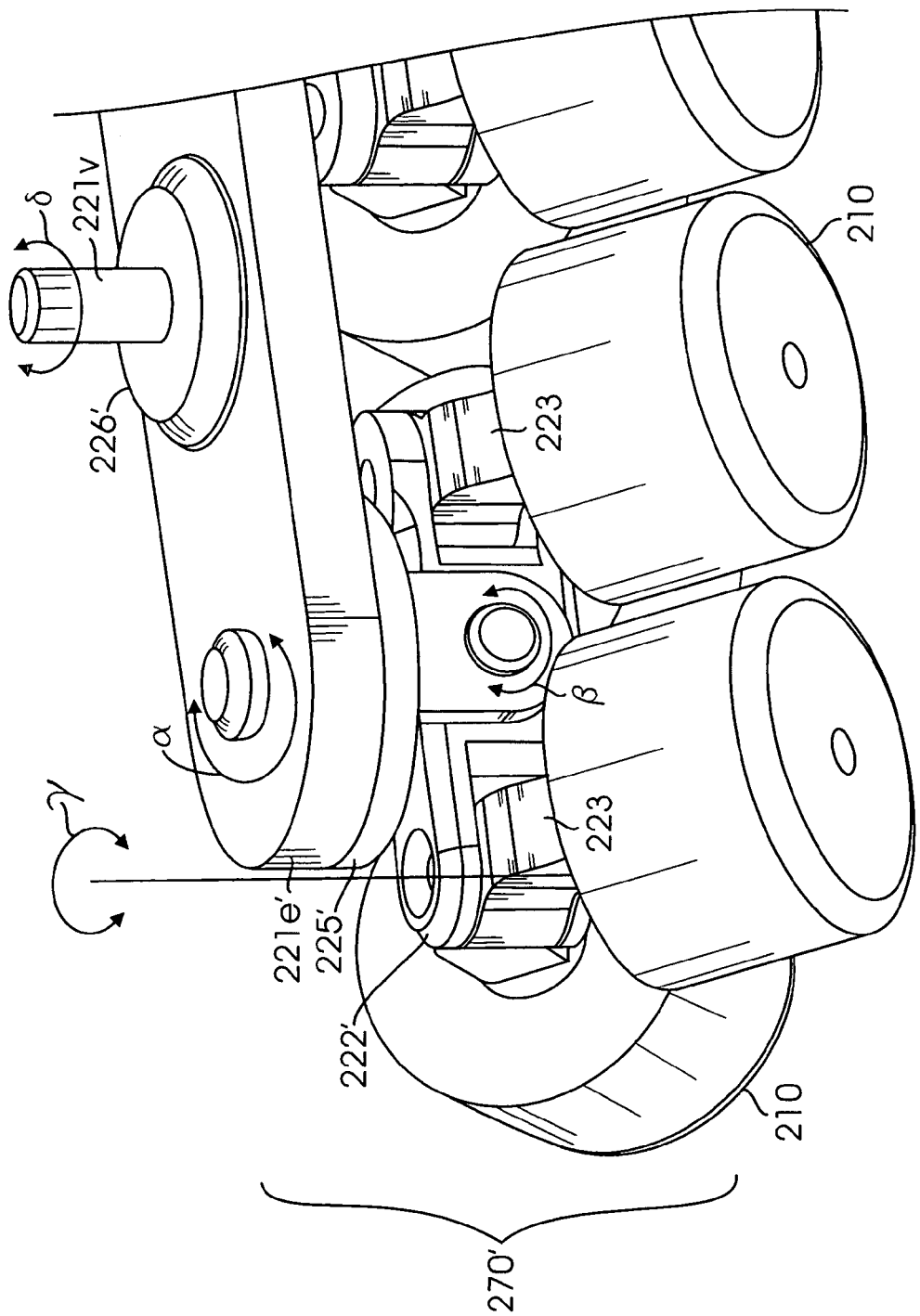
FIG. 19 is a cut-away close-up perspective view of a gimbaling mechanism of an articulating camera transport apparatus, in accordance with an alternative embodiment of the present invention.

FIG. 19 illustrates, in a cut-away close-up perspective view, a gimbaling mechanism 270' of an articulating camera transport apparatus 200, in accordance with an alternative embodiment of the present invention. The at least one rocker arm mid-section 222c' is pivotally coupled with one end of the rigid section ends 221e', wherein the at least one rocker arm 222' is rotatable in relation to the rigid section 221' at an angle alpha in a horizontal plane as well as at an angle beta in a vertical plane. The combined rotation at the angles alpha, beta, gamma, and delta facilitates smooth travel of the apparatus 200 on curved, bumpy, and uneven tracks T.

Figure 20:
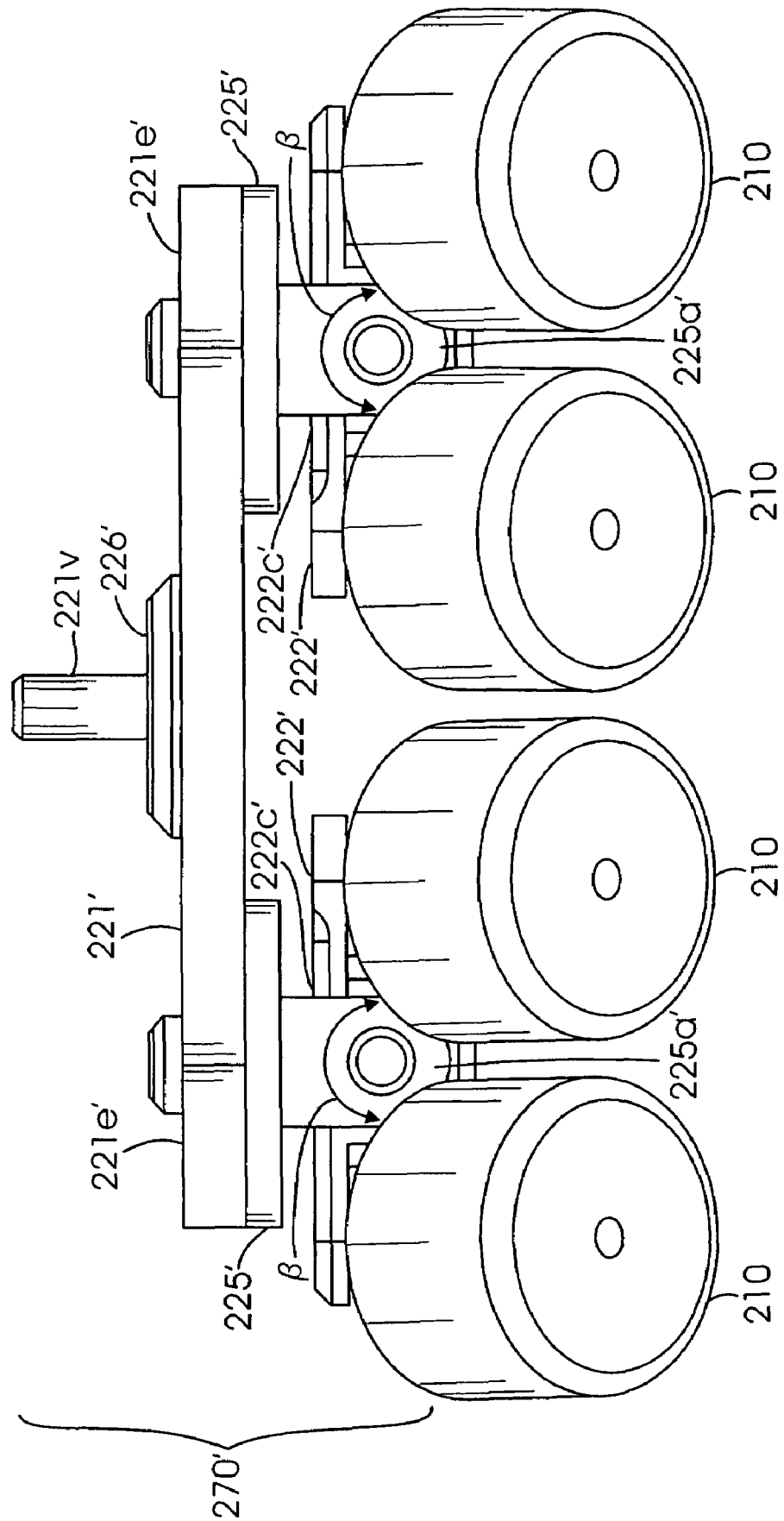
FIG. 20 is a side view of a gimbaling mechanism of an articulating camera transport apparatus, in accordance with an alternative embodiment of the present invention.

FIG. 20 illustrates, in a side view, a gimbaling mechanism 270' of an articulating camera transport apparatus 200, in accordance with an alternative embodiment of the present invention. The at least one rocker arm mid-section 222c' is pivotally coupled with one end of the rigid section ends 221e', wherein the at least one rocker arm 222' is rotatable in relation to the rigid section 221' at an angle alpha in a horizontal plane as well as at an angle beta in a vertical plane.

Figure 21:
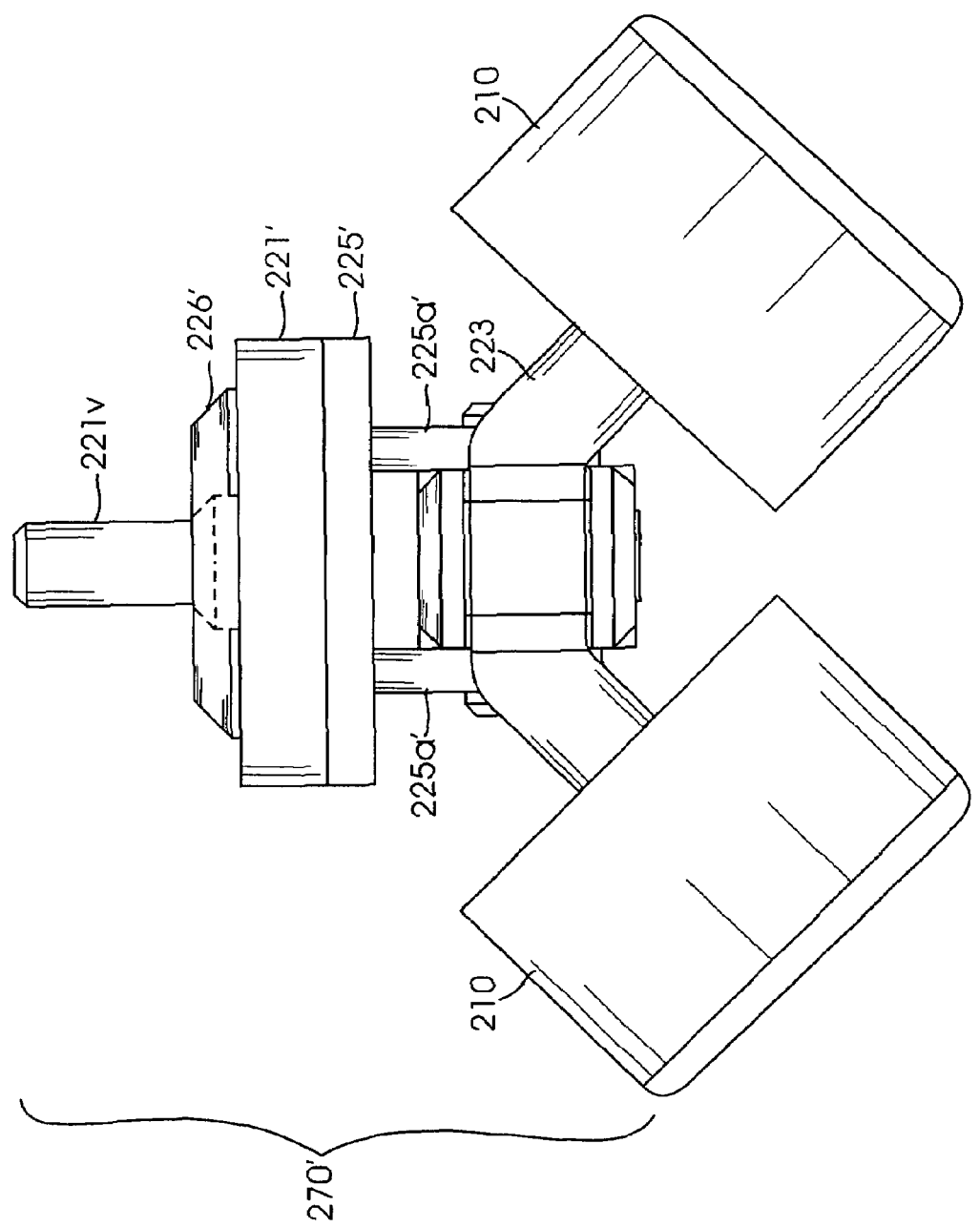
FIG. 21 is a front view of a gimbaling mechanism of an articulating camera transport apparatus, in accordance with an alternative embodiment of the present invention.

FIG. 21 illustrates, in a front view, a gimbaling mechanism 270' of an articulating camera transport apparatus 200, in accordance with an alternative embodiment of the present invention. An angled axle 223 is rotatably coupled to the at least one rocker arm section proximal and distal ends 222a', 222b', wherein the at least one angled axle 223 is rotatable in relation to the at least one rocker arm 222' at an angle gamma in a horizontal plane. The rigid section 221' further comprises vertical member 221v, such as a pin, a rod, and a dowel, which is mechanically coupled to, or integrally formed with, the rigid section 221', wherein the rigid section is rotatable in relation to the undercarriage 260, 260' at an angle delta in a horizontal plane. The combined rotation at the angles alpha, beta, gamma, and delta facilitates smooth travel of the apparatus 200 on curved, bumpy, and uneven tracks T.

Information, as herein shown and described in detail, is fully capable of attaining the above-described object of the invention. The presently preferred embodiment of the invention, are, thus, representative of the subject matter that is broadly contemplated by the present invention. The scope of the present invention also fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem being sought for resolution by the present invention, for such to be encompassed by the present claims. Furthermore, no element, component, or method step in the present disclosure is intended to be dedicated to the public, regardless of whether the element, component, or method step is explicitly recited in the claims. However, that various changes and modifications, in form, material, and fabrication material detail, may be made, without departing from the spirit and scope of the invention as set forth in the appended claims, should be readily apparent to those of ordinary skill in the art as being encompassed by the present invention. No claim herein is to be construed under the provisions of 35 U.S.C. § 112, sixth paragraph, unless the element is expressly recited using the phrase "means for."

INDUSTRIAL APPLICABILITY

The present invention industrially applies to motion picture apparatuses and methods. More particularly, the present invention industrially applies to motion picture apparatuses and methods for accommodating camera equipment. Even more particularly, the present invention industrially applies motion picture apparatuses and methods for accommodating and transporting camera equipment.

What is claimed:

1. An articulating camera transport apparatus, comprising an articulating camera truck for accommodating a camera element and for engaging a set of camera dolly tracks, the tracks having a curvature, the truck comprising a carrier and an undercarriage, the undercarriage comprising a plurality of articulating wheels and means for gimbaling the plurality of articulating wheels for accommodating the curvature and for facilitating a smooth passage of the truck along the tracks, wherein the camera element comprises at least one element selected from a group consisting essentially of a camera platform, a camera dolly, a camera crane, and a camera crane base, wherein the carrier comprises at least one outboard edge and an inboard open section, the carrier being extendible for accommodating varying sizes and orientations of the camera element, wherein the carrier further comprises at least one tap and at least one extension member, the at least one extension member comprising a retaining flange and at least one pin member disposed on a lower surface of the at least one extension member for selective registration with at least one registration element selected from a group consisting essentially of the at least one tap and the at least one outboard edge, the retaining flange being translatable within the inboard open section for imparting structural stability to the at least one extension, wherein the plurality of articulating wheels comprises at least one wheel configuration selected from a group consisting essentially of:

at least one pair of articulating wheels;

at least four pairs of articulating wheels;

at least two sets of articulating wheel pairs; and at least four sets of articulating wheel pairs, wherein the gimbaling means comprises:

a wheel mounting bracket coupled to the undercarriage, the wheel mounting bracket including a rigid section having two ends and at least one rocker arm having a mid-section and two ends, the at least one rocker arm mid-section being pivotally coupled with one end of the rigid section ends; and an angled axle corresponding to each wheel pair, the angled axle being rotatably coupled to the at least one rocker arm end, wherein each set of articulating wheel pairs comprises four articulating wheel pairs, wherein the articulating wheel pairs are pivotally mounted to the rocker arm ends, wherein the at least one rocker arm is rotatable in relation to the rigid section in a horizontal plane and in a vertical plane, wherein the angled axle is rotatable in relation to the at least one rocker arm in a horizontal plane, whereby the articulating wheel pairs rotate as well as rock in relation to the rigid section, and whereby mechanical stability and articulation are optimized, wherein each wheel pair gimbals independently from any other wheel pair, wherein the plurality of articulating wheels comprises a plurality of skateboard wheels, wherein the angled axle subtends an angle of approximately 90°, wherein the undercarriage comprises at least one slot for facilitating translation of the mounting bracket in order to accommodate varying distances between the tracks, wherein the wheel mounting bracket comprises a swivel member being pivotally coupled to the undercarriage, wherein the swivel member is pivotally coupled to the undercarriage through the at least one slot, wherein the gimbaling means further comprises at least one low friction-coefficient member selected from a group consisting essentially of a gasket and a washer, the at least one friction-coefficient member being disposed between the swivel member and the undercarriage, and wherein the low friction-coefficient member comprises at least one material selected from a group consisting essentially of a flexible polymer, an elastic polymer, an elastomer, a polyurethane, a rubber, a nylon, a fluorinated polymer, a resin engineering plastic, a polyoxymethylene, an acetal resin, a polytrioxane, and a polyformaldehyde, for facilitating smoothness and shock absorption.

2. An articulating camera transport apparatus, comprising an articulating camera truck for accommodating a camera element and for engaging a set of camera dolly tracks, the tracks having a curvature, the truck comprising a carrier and an undercarriage, and the undercarriage comprising a plurality of articulating wheels and means for gimbaling the plurality of articulating wheels for accommodating the curvature and for facilitating a smooth passage of the truck along the tracks, wherein the gimbaling means comprises:

a wheel mounting bracket coupled to the undercarriage, the wheel mounting bracket including a rigid section having two ends and at least one rocker arm having a midsection and two ends, the at least one rocker arm midsection being pivotally coupled with one end of the rigid section ends; and an angled axle corresponding to each wheel pair, the angled axle being rotatably coupled to the at least one rocker arm end.

3. An apparatus, as recited in claim 2, wherein the camera element comprises at least one element selected from a group consisting essentially of a camera platform, a camera dolly, a camera crane, and a camera crane base.

4. An apparatus, as recited in claim 2, wherein the carrier comprises at least one outboard edge and an inboard open section, the carrier being extendible for accommodating varying sizes and orientations of the camera element, and wherein the carrier further comprises at least one tap and at least one extension member, the at least one extension member comprising a retaining flange and at least one pin member disposed on a lower surface of the at least one extension member for selective registration with at least one registration element selected from a group consisting essentially of the at least one tap and the at least one outboard edge, the retaining flange being translatable within the inboard open section for imparting structural stability to the at least one extension.

5. An apparatus, as recited in claim 2, wherein the plurality of articulating wheels comprises at least one wheel configuration selected from a group consisting essentially of:

at least one pair of articulating wheels;

at least four pairs of articulating wheels;

at least two sets of articulate wheel pairs; and at least four sets of articulating wheel pairs.

6. An apparatus, as recited in claim 5, wherein each set of articulating wheel pairs comprises four articulating wheel pairs, wherein the articulating wheel pairs are pivotally mounted to the rocker arm ends, wherein the at least one rocker arm is rotatable in relation to the rigid section in a horizontal plane and in a vertical plane, wherein the angled axle is rotatable in relation to the at least one rocker arm in a horizontal plane, and whereby the articulating wheel pairs rotate as well as rock in relation to the rigid section, and whereby mechanical stability and articulation are optimized.

7. An apparatus, as recited in claim 5, wherein each wheel pair gimbals independently from any other wheel pair.

8. An apparatus, as recited in claim 2, wherein the plurality of articulating wheels comprises a plurality of skateboard wheels.

9. An apparatus, as recited in claim 6, wherein the angled axle subtends an angle in a range of approximately 0° to approximately 90°.

10. An apparatus, as recited in claim 9, wherein the angled axle subtends an angle of approximately 90°.

11. An apparatus, as recited in claim 6, wherein the undercarriage comprises at least one slot for facilitating translation of the mounting bracket in order to accommodate varying distances between the tracks, and wherein the wheel mounting bracket comprises a swivel member being pivotally coupled to the undercarriage.

12. An apparatus, as recited in claim 11, wherein the swivel member is pivotally coupled to the undercarriage through the at least one slot.

13. An apparatus, as recited in claim 11, wherein the gimbaling means further comprises at least one low friction-coefficient member selected from a group consisting essentially of a gasket and a washer, the at least one friction-coefficient member being disposed between the swivel member and the undercarriage, and wherein the low friction-coefficient member comprises at least one material selected from a group consisting essentially of a polymer, a composite, a polypropylene, a polyethylene, and a fluorinated polymer.

14. A method of fabricating an articulating camera transport apparatus, comprising the step of providing an articulating camera truck for accommodating a camera element and for engaging a set of camera dolly tracks, the tracks having a curvature, the truck providing step comprising providing a carrier and providing an undercarriage, and the undercarriage providing step comprising providing a plurality of articulating wheels and providing means for gimbaling the plurality of articulating wheels for accommodating the curvature and for facilitating a smooth passage of the truck along the tracks, wherein the gimbaling means providing step comprises:

providing a wheel mounting bracket coupled to the undercarriage, the wheel mounting bracket providing step comprising providing a rigid section having two ends and at least one rocker arm having a mid-section and two ends, the at least one rocker arm providing step comprising pivotally coupling the at least one rocker arm mid-section with one end of the rigid section ends; and providing an angled axle corresponding to each wheel pair, the angled axle providing step comprising rotatably coupling the angled axle with the at least one rocker arm end.

15. A method, as recited in claim 14, further comprising the step of providing the camera element as at least one element selected from a group consisting essentially of a camera platform, a camera dolly, a camera crane, and a camera crane base.

16. A method, as recited in claim 14, wherein the carrier providing step comprises providing at least one outboard edge and providing an inboard open section, the carrier providing step comprising providing the carrier as being extendible for accommodating varying sizes and orientations of the camera element, and wherein the carrier providing step further comprises providing at least one tap and providing at least one extension member, the at least one extension member providing step comprising providing a retaining flange and providing at least one pin member disposed on a lower surface of the at least one extension member for selective registration with at least one registration element selected from a group consisting essentially of the at least one tap and the at least one outboard edge, the retaining flange providing step comprising providing the retaining flange as being translatable within the inboard open section for imparting structural stability to the at least one extension.

17. A method, as recited in claim 14, wherein the plurality of articulating wheels providing step comprises providing at least one wheel configuration selected from a group consisting essentially of:

at least one pair of articulating wheels;
at least four pairs of articulating wheels;
at least two sets of articulating wheel pairs; and
at least four sets of articulating wheel pairs.

18. A method, as recited in claim 17, wherein the plurality of articulating wheels providing step comprises providing each set of articulating wheel pairs comprises four articulating wheel pairs, wherein the plurality of articulating wheels providing step comprises pivotally mounting the articulating wheel pairs to the rocker arm ends, wherein the at least one rocker arm providing step comprises providing the at least one rocker arm being rotatable in relation to the rigid section in a horizontal plane and in a vertical plane, wherein the angled axle providing step comprises providing the angled axle being rotatable in relation to the at least one rocker arm in a horizontal plane, and thereby providing the articulating wheel pairs as being rotatable as well as rockable in relation to the rigid section, and thereby optimizing mechanical stability and articulation.

19. A method, as recited in claim 17, wherein the plurality of articulating wheels providing step comprises providing each wheel pair as being independently gimbaling from any other wheel pair.

20. A method, as recited in claim 14, wherein the plurality of articulating wheels providing step comprises providing the plurality of articulating wheels as a plurality of skateboard wheels.

21. A method, as recited in claim 18, wherein the angled axle providing step comprises subtending an angle in a range of approximately 0° to approximately 90°.

22. A method, as recited in claim 21, wherein the angled axle providing step comprises subtending an angle of approximately 90°.

23. A method, as recited in claim 18, wherein the undercarriage providing step comprises providing at least one slot for facilitating translation of the mounting bracket in order to accommodate varying distances between the tracks, and wherein the wheel mounting bracket providing step comprises providing a swivel member being pivotally coupled to the undercarriage.

24. A method, as recited in claim 23, wherein the swivel member providing step comprises pivotally coupling the swivel member to the undercarriage through the at least one slot.

25. A method, as recited in claim 23, wherein the gimbaling means providing step further comprises providing at least one low friction-coefficient member selected from a group consisting essentially of a gasket and a washer, the at least one friction-coefficient member being disposed between the swivel member and the undercarriage, and wherein the low friction-coefficient member providing step comprises providing at least one material selected from a group consisting essentially of a polymer, a composite, a polypropylene, a polyethylene, and a fluorinated polymer.

26. A method, as recited in claim 14, further comprising the step of providing the camera element as at least one element selected from a group consisting essentially of a camera platform, a camera dolly, a camera crane, and a camera crane base, wherein the carrier providing step comprises providing at least one outboard edge and providing an inboard open section, the carrier providing step comprising providing the carrier as being extendible for accommodating varying sizes and orientations of the camera element, wherein the carrier providing step further comprises providing at least one tap and providing at least one extension member, the at least one extension member providing step comprising providing a retaining flange and providing at least one pin member disposed on a lower surface of the at least one extension member for selective registration with at least one registration element selected from a group consisting essentially of the at least one tap and the at least one outboard edge, the retaining flange providing step comprising providing the retaining flange as being translatable within the inboard open section for imparting structural stability to the at least one extension, wherein the plurality of articulating wheels providing step comprises providing at least one wheel configuration selected from a group consisting essentially of:

at least one pair of articulating wheels;
at least four pairs of articulating wheels;
at least two sets of articulating wheel pairs; and at least four sets of articulating wheel pairs,
wherein the plurality of articulating wheels providing step comprises providing each set of articulating wheel pairs comprises four articulating wheel pairs,
wherein the plurality of articulating wheels providing step comprises pivotally mounting the articulating wheel pairs to the rocker arm ends,
wherein the at least one rocker arm providing step comprises providing the at least one rocker arm being rotatable in relation to the rigid section in a horizontal plane and in a vertical plane,
wherein the angled axle providing step comprises providing the angled axle being rotatable in relation to the at least one rocker arm in a horizontal plane,
thereby providing the articulating wheel pairs as being rotatable as well as rockable in relation to the rigid section, and thereby optimizing mechanical stability and articulation,
wherein the plurality of articulating wheels providing step comprises providing each wheel pair as being independently gimbaling from any other wheel pair,
wherein the plurality of articulating wheels providing step comprises providing the plurality of articulating wheels as a plurality of skateboard wheels,
wherein the angled axle providing step comprises subtending an angle of approximately 90°,
wherein the undercarriage providing step comprises providing at least one slot for facilitating translation of the mounting bracket in order to accommodate varying distances between the tracks,
wherein the wheel mounting bracket providing step comprises providing a swivel member being pivotally coupled to the undercarriage,
wherein the swivel member providing step comprises pivotally coupling the swivel member to the undercarriage through the at least one slot,
wherein the gimbaling means providing step further comprises providing at least one low friction-coefficient member selected from a group consisting essentially of a gasket and a washer, the at least one friction-coefficient member being disposed between the swivel member and the undercarriage, and
wherein the low friction-coefficient member providing step comprises providing at least one material selected from a group consisting essentially of a polymer, a composite, a polypropylene, a polyethylene, and a fluorinated polymer.

27. A method of transporting a camera element by way of an articulating camera transport apparatus, comprising the steps of:
providing an articulating camera truck for accommodating a camera element and for engaging a set of camera dolly tracks, the tracks having a curvature, the truck providing step comprising providing a carrier and providing an undercarriage, the undercarriage providing step comprising providing a plurality of articulating wheels and providing means for gimbaling the plurality of articulating wheels for accommodating the curvature and for facilitating a smooth passage of the truck along the tracks;
disposing the camera element on the articulating camera truck; and
applying a force to the articulating camera truck, thereby transporting the camera element,
wherein the gimbaling means providing step comprises:
providing a wheel mounting bracket coupled to the undercarriage, the wheel mounting bracket providing step comprising providing a rigid section having two ends and at least one rocker arm having a mid-section and two ends, the at least one rocker arm providing step comprising pivotally coupling the at least one rocker arm mid-section with one end of the rigid section ends; and
providing an angled axle corresponding to each wheel pair, the angled axle being rotatably coupled to the at least one rocker arm end.

28. A method, as recited in claim 27,
wherein the carrier providing step comprises providing the carrier as being extendible for accommodating varying sizes and orientations of the camera element, and
wherein the carrier providing step further comprises providing at least one tap and providing at least one extension member, the at least one extension member providing step comprising providing at least one pin member disposed on a lower surface of the at least one extension member for selective registration with the at least one tap.

29. A method, as recited in claim 28, further comprising the step of adjusting the carrier by registering the at least one pin member with the at least one tap.

30. An apparatus, as recited in claim 2, further comprising:
at least one more articulating camera truck; and
a carrying case for storing the at least one articulating camera transport apparatus.

31. An apparatus, as recited in claim 30, further comprising at least one placard for mechanical attachment to the apparatus.

32. An apparatus, as recited in claim 31, wherein the placard comprises indicia.

33. An apparatus, as recited in claim 31, wherein the indicia comprises at least one indicium selected from a group consisting essentially of a trademark, service mark, production information, and technical information.

* * * * *